United States Patent
Hotta et al.

(10) Patent No.: US 11,536,211 B2
(45) Date of Patent: Dec. 27, 2022

(54) POWERTRAIN SYSTEM

(71) Applicant: TOYOTA JIDOSHA KABUSHIKI KAISHA, Toyota (JP)

(72) Inventors: Shintaro Hotta, Sunto-gun (JP); Takashi Kawai, Susono (JP); Shunsuke Fushiki, Susono (JP); Hideto Wakabayashi, Numazu (JP); Hirokazu Ito, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 80 days.

(21) Appl. No.: 16/918,127

(22) Filed: Jul. 1, 2020

(65) Prior Publication Data
US 2021/0062742 A1 Mar. 4, 2021

(30) Foreign Application Priority Data
Sep. 3, 2019 (JP) .............................. JP2019-160682

(51) Int. Cl.
*F02D 41/06* (2006.01)
*F02D 41/02* (2006.01)
(Continued)

(52) U.S. Cl.
CPC ............. *F02D 41/0235* (2013.01); *B60K 6/24* (2013.01); *B60K 6/26* (2013.01); *B60K 6/28* (2013.01);
(Continued)

(58) Field of Classification Search
CPC .... F02N 11/0814; F02N 11/04; F02N 99/006; F02D 41/062; F02D 41/042;
(Continued)

(56) References Cited

U.S. PATENT DOCUMENTS 6,098,585 A * 8/2000 Brehob ................. F02D 41/062
123/179.5
6,981,481 B2 * 1/2006 Kojima ................. F02N 99/006
123/179.3
(Continued)

FOREIGN PATENT DOCUMENTS

DE 195 27 503 A1 1/1997
DE 102004007001 A1 9/2004
(Continued)

OTHER PUBLICATIONS

Partial English Translation of Oct. 4, 2022 Office Action issued in Japanese Patent Application No. 2019-160682.

*Primary Examiner* — Gonzalo Laguarda
(74) *Attorney, Agent, or Firm* — Oliff PLC

(57) ABSTRACT

A powertrain system includes a port injection internal combustion engine. A first start process is a process in which fuel is enclosed in a compression stroke cylinder when the engine is stopped, and based on a stored crank stop position, ignition is performed in a first cycle of the compression stroke cylinder upon engine start. A second start process is a process in which, based on the stored crank stop position, fuel injection is performed for an intake stroke cylinder while the engine is stopped, and based on the stored crank stop position, ignition is performed in the first cycle of the intake stroke cylinder upon engine start. When a catalyst temperature at the time engine start is requested is equal to or higher than a first threshold, a control device starts the internal combustion engine by at least one of the first start process and the second start process.

17 Claims, 16 Drawing Sheets

(51) Int. Cl.
  *B60K 6/24* (2007.10)
  *B60K 6/26* (2007.10)
  *B60K 6/28* (2007.10)
  *F01N 3/28* (2006.01)
  *F02B 75/20* (2006.01)
  *F02D 41/00* (2006.01)
  *F02D 41/34* (2006.01)
  *F02M 61/14* (2006.01)
  *F02N 11/04* (2006.01)
  *F02P 5/04* (2006.01)
  *F02B 75/18* (2006.01)

(52) U.S. Cl.
  CPC ............ *F01N 3/28* (2013.01); *F02B 75/20* (2013.01); *F02D 41/009* (2013.01); *F02D 41/062* (2013.01); *F02D 41/345* (2013.01); *F02M 61/145* (2013.01); *F02N 11/04* (2013.01); *F02P 5/04* (2013.01); *F02B 2075/1816* (2013.01); *F02D 2200/0802* (2013.01)

(58) Field of Classification Search
  CPC .. F02D 41/0235; F02D 41/009; F02D 41/345; B60K 6/24; B60K 6/26; B60K 6/28; F01N 3/28; F02B 75/20; F02M 61/145; F02P 5/04
  See application file for complete search history.

(56) References Cited

U.S. PATENT DOCUMENTS

| | | | | |
|---|---|---|---|---|
| 7,011,063 | B2* | 3/2006 | Condemine | F02N 99/006 290/38 B |
| 7,066,128 | B2* | 6/2006 | Satake | F02N 99/004 701/113 |
| 7,240,663 | B2* | 7/2007 | Lewis | F02D 37/02 123/90.11 |
| 7,269,499 | B2* | 9/2007 | Murakami | F02N 11/0814 701/112 |
| 7,461,621 | B2* | 12/2008 | Ota | F02B 23/104 123/179.3 |
| 8,423,271 | B2* | 4/2013 | Gibson | F02N 11/0814 701/112 |
| 8,626,425 | B2* | 1/2014 | Gibson | F02D 41/062 701/112 |
| 8,763,580 | B2* | 7/2014 | Belau | F02N 19/005 123/179.3 |
| 9,382,864 | B2* | 7/2016 | Gibson | F02D 41/062 |
| 10,465,624 | B2* | 11/2019 | Suzuki | F02D 41/1444 |
| 10,920,732 | B1* | 2/2021 | Ord | F02N 99/004 |
| 2004/0060535 | A1 | 4/2004 | Osawa et al. | |
| 2004/0159297 | A1 | 8/2004 | Kataoka et al. | |
| 2010/0276218 | A1* | 11/2010 | Thompson | B60W 20/40 180/65.28 |
| 2015/0219036 | A1* | 8/2015 | Gibson | F02D 41/402 123/294 |

FOREIGN PATENT DOCUMENTS

| | | |
|---|---|---|
| EP | 1 479 895 A2 | 11/2004 |
| EP | 2 644 469 A1 | 10/2013 |
| JP | 10-506694 A | 6/1998 |
| JP | 2001-221138 A | 8/2001 |
| JP | 2004-176710 A | 6/2004 |
| JP | 2004-245116 A | 9/2004 |
| JP | 2005-299400 A | 10/2005 |
| JP | 2011-099357 A | 5/2011 |
| JP | 2014-185524 A | 10/2014 |
| JP | 2015-045247 A | 3/2015 |

\* cited by examiner

POWERTRAIN SYSTEM

INCORPORATION BY REFERENCE

The disclosure of Japanese Patent Application No. 2019-160682 filed on Sep. 3, 2019 including the specification, drawings and abstract is incorporated herein by reference in its entirety.

BACKGROUND

1. Technical Field

The disclosure relates to powertrain systems.

2. Description of Related Art

For example, Japanese Patent Application Publication No. 2001-221138 (JP 2001-221138 A) discloses a starting device for an internal combustion engine. This internal combustion engine is a direct injection engine that is used for start-stop vehicles. In order to improve engine start capability, the starting device is configured to detect the rotational position of a crankshaft when the engine is stopped and rotate the crankshaft using an electric motor (starter motor) while the engine is stopped so as to obtain a crank angle that is optimal for restarting of the engine. JP 2001-221138 A discloses early start control for direct injection engines. In this early start control, when the engine is restarted, fuel injection and ignition are started from the cylinder that is in a compression stroke or an intake stroke while the engine is stopped by an automatic stop process (compression stroke cylinder or intake stroke cylinder). JP 2001-221138 A describes an example of rotation control of a crankshaft to an optimum crank angle which is intended for port fuel injection engines. In this example, by setting a crank angle immediately before an intake valve of a certain cylinder is opened to an optimal crank angle, injected fuel is introduced into the cylinder as soon as cranking is started, so that compression and combustion are performed immediately.

Japanese Patent Application Publication No. 2011-099357 (JP 2011-099357 A) discloses a technique in which cylinder identification is carried out by a crank angle sensor using a ferromagnetic magnetoresistive element (MRE) in a spark ignition internal combustion engine that performs an automatic stop process and an engine restart process. This technique is in order to quickly restart the engine. Japanese Patent Application Publication No. 2014-185524 (JP 2014-185524 A) discloses a technique in which a large amount of fuel is supplied to a combustion chamber and burned upon engine start to rapidly increase the engine speed and thus reduce hydrocarbons (HC) in burned gas. Japanese Patent Application Publication No. 2015-045247 (JP 2015-045247 A) discloses a technique in which when the engine is stopped, the stop position of a crankshaft is controlled to a position near a compression top dead center.

SUMMARY

In a powertrain system including an internal combustion engine for either or both of vehicle traction and power generation, the temperature of an exhaust control catalyst (hereinafter sometimes simply referred to as the "catalyst") becomes high when the internal combustion engine is frequently in a high load range during its operation. In the case where the catalyst temperature is high at the time the internal combustion engine is stopped, the catalyst temperature may still be high when the engine is restarted. Catalyst deterioration tends to occur when gas with a high oxygen concentration flows into the high temperature catalyst. Accordingly, catalyst deterioration may proceed when air (oxygen) flows into the high temperature catalyst with rotation of a crankshaft immediately after the engine is started (restarted).

The disclosure provides a powertrain system that can reduce entry of oxygen into an exhaust control catalyst when an engine is started under the condition that the exhaust control catalyst has a high temperature.

An aspect of the disclosure relates to a powertrain system. The powertrain system includes: an internal combustion engine; a first electric motor; a stop position sensor; and a control device. The internal combustion engine includes at least one cylinder, a crankshaft, a fuel injection system, an ignition system that ignites an air-fuel mixture, and an exhaust control catalyst disposed in an exhaust passage. The fuel injection system includes a fuel injection valve that is disposed in each of the at least one cylinder and that injects fuel into an intake port. The first electric motor is able to crank the internal combustion engine. The stop position sensor detects a crank stop position of the crankshaft. The control device is configured to control the internal combustion engine and the first electric motor and to perform a stop position storage process of storing the crank stop position detected by the stop position sensor. The control device is further configured to execute an early start mode when a temperature of the exhaust control catalyst at the time the engine start request is made is equal to or higher than a first threshold. The early start mode is a mode in which the internal combustion engine is started by at least one of a first start process and a second start process. The control device is further configured to execute a normal start mode when the temperature of the exhaust control catalyst at the time the engine start request is made is lower than the first threshold. The normal start mode is a mode in which the internal combustion engine is started by neither the first start process nor the second start process. The first start process is a process that is performed for a compression stroke cylinder that is in a compression stroke while the engine is stopped, and is a process in which fuel injection is performed such that fuel is introduced into the compression stroke cylinder during a last intake stroke that is performed in a course of stopping the engine, and based on the stored crank stop position, ignition is performed in a first cycle of the compression stroke cylinder after start of cranking in response to an engine start request. The second start process is a process that is performed for an intake stroke cylinder that is in an intake stroke while the engine is stopped, and is a process in which, based on the stored crank stop position, fuel injection is performed during a period from a time when the engine start request is made to a first timing at which an intake valve is closed after the start of the cranking, and based on the stored crank stop position, ignition is performed in a first cycle of the intake stroke cylinder after the start of the cranking.

According to the powertrain system of the above aspect, the early start mode is executed when the temperature of the exhaust control catalyst at the time the engine start request is made is equal to or higher than the first threshold. In the early start mode, the internal combustion engine is started by at least one of the first and second start processes. By using the stored crank stop position, at least one of the first and second start processes can be performed immediately after the start of the cranking. According to the first start process, combustion can be performed in the first expansion stroke of the compression stroke cylinder after the start of the cranking. According to the second start process, combustion can be performed in the first expansion stroke of the intake stroke cylinder after the start of the cranking. As a result, gas that is discharged in the first exhaust stroke of the compression stroke cylinder is burned gas, and the same applies to the intake stroke cylinder. The powertrain system having the early start mode thus reduces entry of oxygen into the exhaust control catalyst when the engine is started under the condition that the exhaust control catalyst has a high temperature.

In the above aspect, the powertrain system may further include a rotating electrical machine coupled to the crankshaft. The control device may perform stop position control. The stop position control is control in which the rotating electrical machine is controlled such that the crank stop position is located within a predetermined range that is required to perform at least one of the first start process and the second start process.

In the above aspect, the internal combustion engine may be an inline three-cylinder engine. A reference position of the predetermined range of the crank stop position may be such a position that a piston stop position of the compression stroke cylinder is 60° before a compression top dead center in crank angle and a piston stop position of the intake stroke cylinder is 60° after an exhaust top dead center in crank angle.

In the above aspect, the internal combustion engine may be an inline four-cylinder engine. A reference position of the predetermined range of the crank stop position may be such a position that a piston stop position of the compression stroke cylinder is 90° before a compression top dead center in crank angle and a piston stop position of the intake stroke cylinder is 90° after an exhaust top dead center in crank angle.

In the above aspect, in the early start mode, the control device may perform both the first start process and the second start process when a vehicle speed of a vehicle equipped with the powertrain system is equal to or higher than a second threshold, and may perform only one of the first start process and the second start process when the vehicle speed is lower than the second threshold.

In the above aspect, the first electric motor may be a motor generator that is able to crank the internal combustion engine and that also generates electric power using power of the internal combustion engine. The powertrain system may further include: a second electric motor that drives the vehicle; and a battery that stores the electric power generated by the motor generator. In the early start mode, the control device may perform only one of the first start process and the second start process when the vehicle speed is lower than the second threshold and a remaining charge level of the battery is higher than a third threshold, and may perform both the first start process and the second start process when the vehicle speed is lower than the second threshold but the remaining charge level of the battery is equal to or lower than the third threshold.

In the above aspect, the first electric motor may be a motor generator that is able to crank the internal combustion engine and that also generates electric power using power of the internal combustion engine. The powertrain system may further include: a second electric motor that drives the vehicle equipped with the powertrain system; and a battery that stores the electric power generated by the motor generator. The control device may control the second electric motor and the motor generator. The internal combustion engine may be exclusively for power generation.

In the above aspect, the control device may start the fuel injection by the second start process before the start of the cranking.

In the above aspect, the control device may advance a timing at which the fuel injection by the second start process is started when an outside air temperature is low as compared to when the outside air temperature is high.

In the above aspect, the control device may start the fuel injection by the second start process in synchronization with the start of the cranking.

In the above aspect, the first threshold may be equal to or higher than 700° C.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the disclosure and reference examples will be described with reference to the accompanying drawings. The same elements are denoted with the same reference signs throughout the figures, and repetitive description will be omitted or simplified. Any numerical value regarding an element, such as the number, quantity, amount, or range of an element, mentioned in the following description of the embodiments is not intended to limit the disclosure unless otherwise specified or unless it is theoretically obvious that the disclosure is limited to the numerical value. Moreover, any structure, step, etc. described in the following embodiments is not essential to the disclosure unless otherwise specified or unless it is theoretically obvious that the structure, step, etc. is essential to the disclosure.

First Embodiment

A first embodiment of the disclosure will be described with reference to FIGS. 1 to 10.

Configuration of Powertrain System

Figure 1:
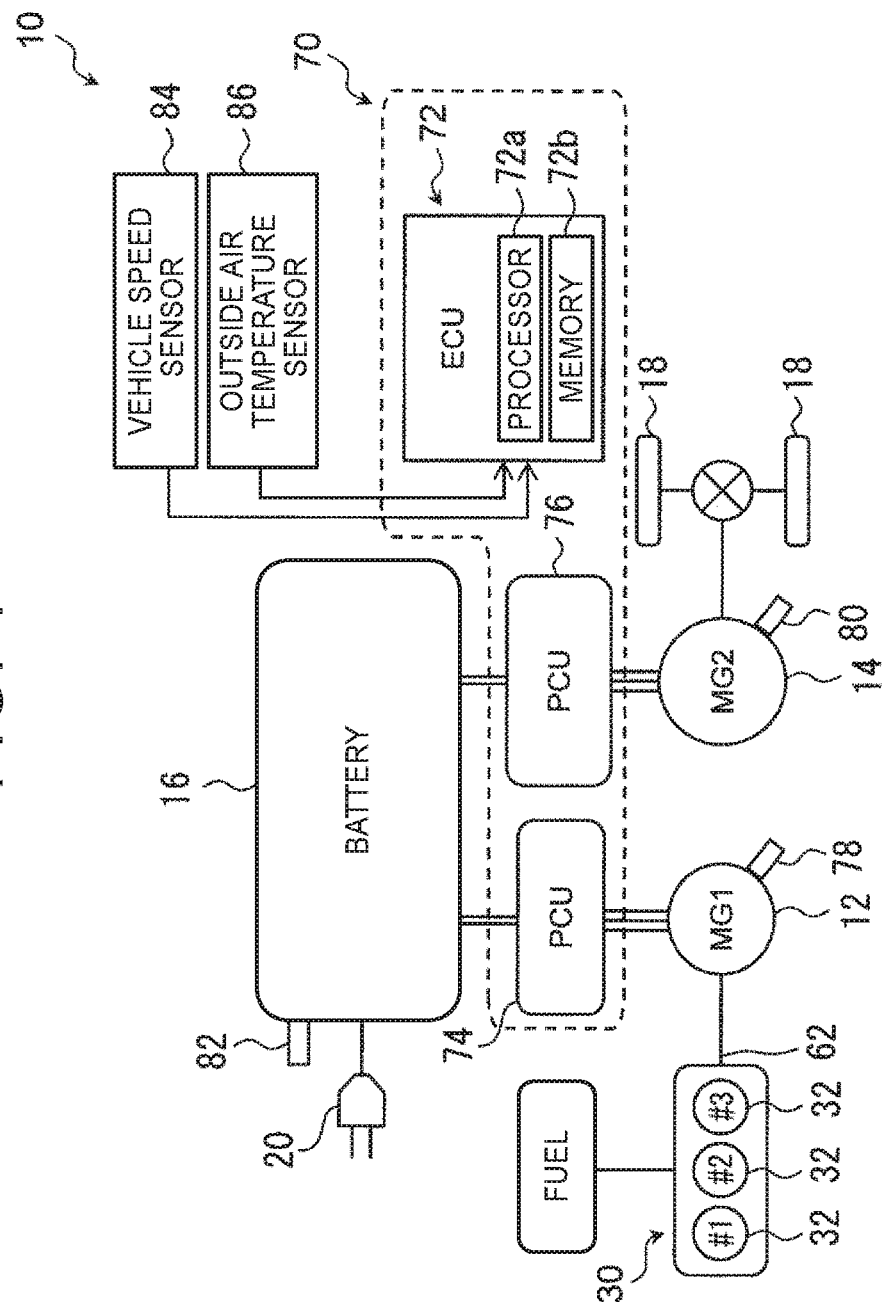
FIG. 1 schematically illustrates an example of a configuration of a powertrain system according to a first embodiment.

FIG. 1 schematically illustrates an example of a configuration of a powertrain system 10 according to the first embodiment. The powertrain system 10 includes two motor generators 12, 14, a battery 16, an internal combustion engine 30, and a control device 70. Hereinafter, the first motor generator 12 is sometimes referred to as "MG1," and the second motor generator 14 is sometimes referred to as "MG2."

MG2 is used as an electric motor that drives a vehicle (wheels 18), except when regenerative braking is performed during deceleration of the vehicle. MG2 is therefore an example of the "second electric motor" according to the disclosure. For example, MG2 is a three-phase AC motor generator. The battery (DC power supply) 16 stores electric power to be supplied to MG2. The powertrain system 10 is configured so that it can charge the battery 16 with electric power supplied from outside the vehicle via a plug 20.

The powertrain system 10 also generates electric power using the internal combustion engine 30 and MG1 in order to increase the driving range of the vehicle. Specifically, MG1 is coupled to the internal combustion engine 30 and is driven by the power of the internal combustion engine 30 to generate electric power. The generated electric power is supplied to the battery 16. MG 1 also functions as a starter motor that cranks the internal combustion engine 30. MG1 is therefore an example of the "first electric motor" and the "motor generator" according to the disclosure. For example, MG1 is also a three-phase AC motor generator.

The internal combustion engine 30 is supplied with fuel to operate. Specifically, the internal combustion engine 30 is a spark ignition engine and is, e.g., an inline three-cylinder engine having three cylinders 32 #1 to 32 #3. The firing order of the internal combustion engine 30 is the cylinders 32 #1, 32 #2, and 32 #3. The phase difference between adjacent ones of the cylinders 32 in the firing order is 240° in crank angle.

Figure 2:
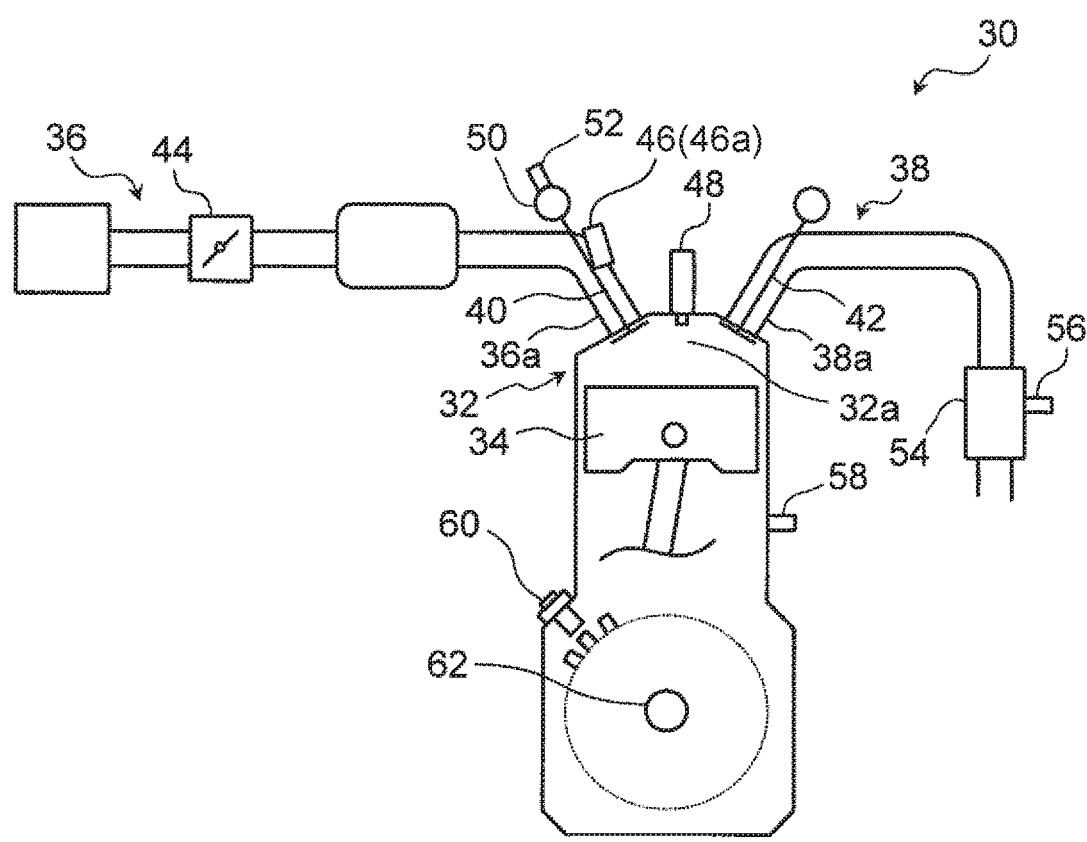
FIG. 2 schematically illustrates an example of a configuration of an internal combustion engine shown in FIG. 1.

FIG. 2 schematically illustrates an example of a configuration of the internal combustion engine 30 shown in FIG. 1. The internal combustion engine 30 is, e.g., a naturally aspirated engine, but may be configured as a supercharged engine. A piston 34 is disposed in each cylinder 32. The piston 34 reciprocates in the cylinder 32. An intake passage 36 and an exhaust passage 38 communicate with a combustion chamber 32a of each cylinder 32. An intake port 36a of the intake passage 36 is opened and closed by an intake valve 40, and an exhaust port 38a of the exhaust passage 38 is opened and closed by an exhaust valve 42. An electronically controlled throttle valve 44 is disposed in the intake passage 36 in order to control the amount of intake air. The internal combustion engine 30 includes a fuel injection system 46 (only a fuel injection valve 46a is shown in the FIG. 46 and an ignition system 48 (only a spark plug is shown in the figure). The fuel injection valve 46a of the fuel injection system 46 is disposed for each cylinder 32 and injects fuel into the intake port 36a. A cam angle sensor 52 is disposed on a camshaft 50 that drives the intake valve 40. The cam angle sensor 52 outputs a cylinder identification signal when it detects a specific rotation position of the camshaft 50.

An exhaust control catalyst 54 (hereinafter simply referred to as the "catalyst 54") is disposed in the exhaust passage 38. More specifically, the catalyst 54 is the most upstream one of a plurality of catalysts (the catalysts other than the catalyst 54 are not shown in the figure) disposed in the exhaust passage 38. That is, the catalyst 54 is what is called a start catalyst. A catalyst temperature sensor 56 is attached to the catalyst 54. The catalyst temperature sensor 56 outputs a signal according to the temperature T of the catalyst 54.

The internal combustion engine 30 further includes a coolant temperature sensor 58 and a crank angle sensor 60. The coolant temperature sensor 58 outputs a signal according to the engine coolant temperature, and the crank angle sensor 60 outputs a signal according to the crank angle. More specifically, the crank angle sensor 60 is disposed near a crankshaft 62 and is of, e.g., a type having a function to detect reverse rotation (e.g., a magnetoresistive element type (MRE type)). The crank angle sensor 60 is an example of the "stop position sensor" according to the disclosure.

The powertrain system 10 further includes a control device 70. The control device 70 controls MG1, MG2, and the internal combustion engine 30 (including the throttle valve 44, the fuel injection system 46, and the ignition system 48). The control device 70 includes an electronic control unit (ECU) 72 and power control units (PCUs) 74, 76. The ECU 72 has at least one processor 72a and at least one memory 72b. The memory 72b stores therein various data and various control programs including maps used to control MG1, MG2, and the internal combustion engine 30. When the processor 72a reads and executes any of the control programs from the memory 72b, the control device 70 performs various processes and controls.

Each of the PCUs 74, 76 includes a power converter (inverter) including a plurality of switching elements. The PCU 74 controls MG1 based on commands from the ECU 72, and the PCU 76 controls MG2 based on commands from the ECU 72. The control device 70 may be configured using a plurality of ECUs. Specifically, the control device 70 may separately include, e.g., an ECU that controls the powertrain system 10 as a whole, an ECU that controls the internal combustion engine 30, an ECU that controls MG1, and an ECU that controls MG2.

The ECU 72 obtains sensor signals from various sensors that control operation of the powertrain system 10. The various sensors include the cam angle sensor 52, the catalyst temperature sensor 56, the coolant temperature sensor 58, the crank angle sensor 60, rotation angle sensors (resolvers) 78, 80, a current sensor 82, a vehicle speed sensor 84, and an outside air temperature sensor 86. The rotation angle sensor 78 detects the rotation angle of MG1, and the rotation angle sensor 80 detects the rotation angle of MG2. The current sensor 82 detects a current flowing in the battery 16. The vehicle speed sensor 84 detects the speed (vehicle speed V) of the vehicle equipped with the powertrain system 10, and the outside air temperature sensor 86 detects the air temperature outside the vehicle. The ECU 72 can perform a cylinder identification process using signals from the crank angle sensor 60 and the cam angle sensor 52 upon engine start.

The vehicle equipped with the powertrain system 10 having the above configuration corresponds to what is called a range extended electric vehicle (REEV). More specifically, the REEV serves as a battery-electric vehicle (BEV) that, when started, runs solely on electric power stored in the battery 16 until the remaining charge level of the battery 16 (more specifically, the state of charge (SOC)) indicating the level of charge of the battery 16 relative to its capacity) decreases to a predetermined lower limit or less. When the SOC decreases to the lower limit or less, the battery 16 is charged with electric power generated using the power of the internal combustion engine 30 in order to extend the driving range. The internal combustion engine 30 is an engine exclusively for power generation. REEVs are sometimes classified as a type of plug-in hybrid electric vehicle (PHEV).

Example of Definition of REEVs

For example, REEVs can be defined as follows. According to the California Air Resources Board (CARE), vehicles satisfying all of the following four requirements are defined as REEVs.

(1) The vehicle must have a rated all-electric range of at least 75 miles.

(2) The auxiliary power unit (APU) must provide range less than, or at most equal to, that battery range (i.e., the range provided by the electric power generated by the power of the internal combustion engine must be less than, or at most equal to, that battery range).

(3) The APU must not be able to switch on until the battery charge has been depleted.

(4) The vehicle must meet "super ultra low emission vehicle" (SULEV) requirements and must comply with zero evaporative emissions requirements.

1-2. Control for Reducing Entry of Oxygen into Catalyst

The ECU 72 of the powertrain system 10 mounted on the REEV starts the internal combustion engine 30 to generate electric power, when the remaining charge level (SOC) of the battery 16 decreases to the predetermined lower limit or less. The internal combustion engine 30 is therefore started intermittently every time a request for power generation occurs. The catalyst deterioration may be occur with such intermittent engine start.

Catalyst Deterioration

When an internal combustion engine is frequently in a high load range during its operation, the exhaust gas temperature usually becomes higher and therefore the catalyst temperature also becomes higher. As a result, the catalyst temperature may still be high when the engine is restarted after being stopped (i.e., upon intermittent engine start). Catalyst deterioration tends to increase when gas with a high oxygen concentration flows into a high-temperature catalyst.

Figure 3:
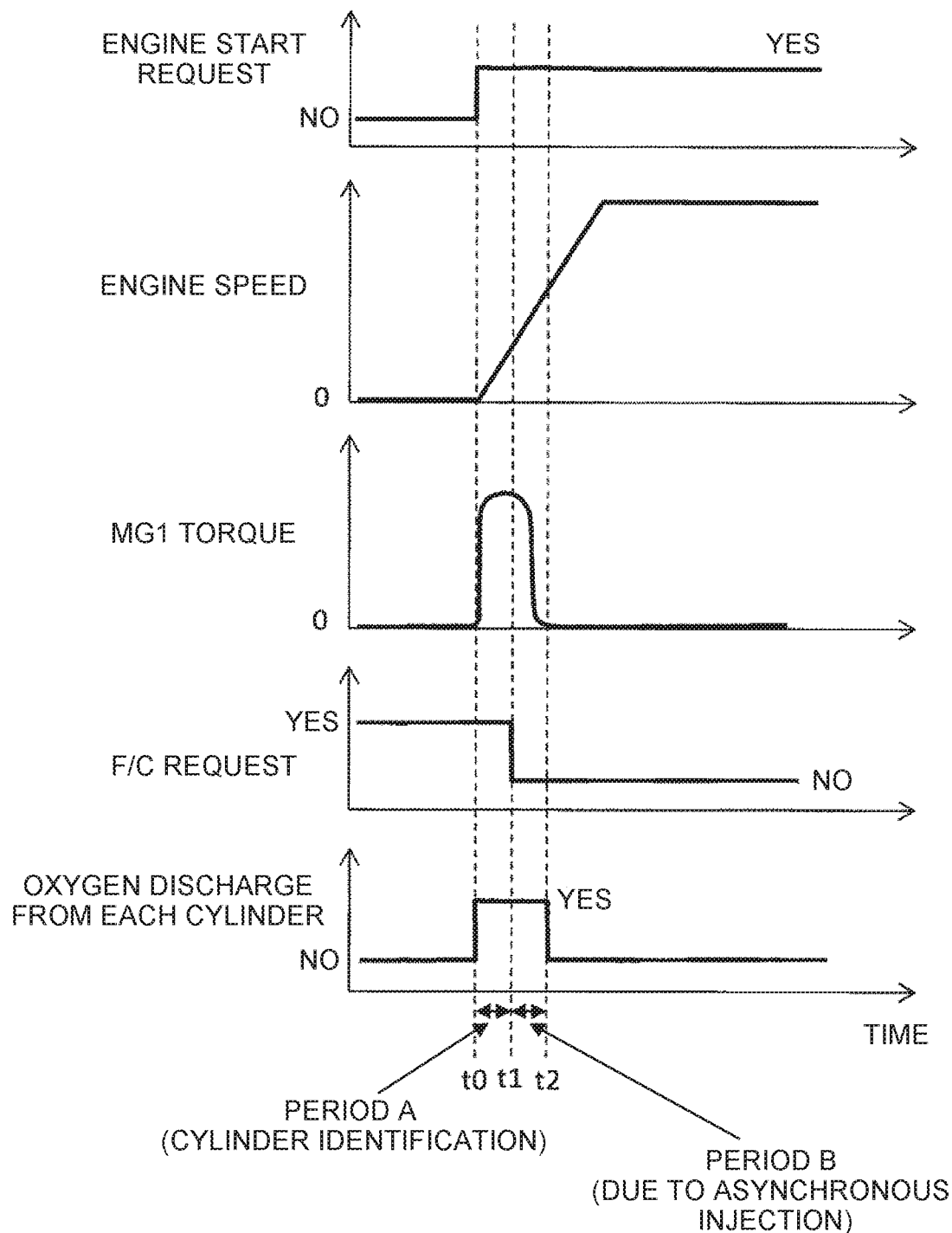
FIG. 3 is a timing chart of an operation that is performed upon intermittent engine start in a comparative example.

FIG. 3 is a timing chart of an operation that is performed upon intermittent engine start in a comparative example. This comparative example illustrates a common starting method for a powertrain system having a hardware configuration similar to that of the powertrain system 10, which does not adopt the measures taken in the first embodiment. Time t0 in FIG. 3 corresponds to the time a predetermined engine start request is made. In this comparative example, when there is a fuel cutoff (F/C) request, cranking of the internal combustion engine is started using MG1 in response to an engine start request. As a result, the engine speed increases. Time t1 corresponds to the time the F/C request is no longer present, namely the time fuel injection is started.

The count value of a crank angle counter that counts crank angle signals is typically reset to zero when the engine is stopped. Cylinder identification that is carried out using a crank angle sensor and a cam angle sensor upon engine start typically requires one or two rotations of a crankshaft. The period from time t0 to time t1 corresponds to a period A that is required for cylinder identification after the start of cranking. The gas that is present in each cylinder while the engine is stopped is air. Accordingly, with rotation of the crankshaft during the period A, air is discharged from each cylinder and oxygen contained in the air enters a catalyst.

In the comparative example, fuel is injected at time t1 by a common method using port injection. Specifically, this fuel injection is performed for each cylinder during a crank angle period other than a period during which an intake valve is open (e.g., during an exhaust stroke) (hereinafter, this fuel injection is referred to as "intake asynchronous injection"). When such intake asynchronous injection is performed at time t1, a period B (t1 to t2) corresponding to two rotations of the crankshaft is required for burned gas resulting from combustion of fuel in each cylinder to be discharged from each cylinder. Oxygen also enters the catalyst with rotation of the crankshaft during the period B.

The crankshaft thus makes at most four rotations during the total period of A and B. Namely, the crankshaft makes at most four rotations before the burned gas starts to be supplied to the catalyst after intermittent engine start. When the catalyst temperature is high upon intermittent engine start, catalyst deterioration may proceed due to oxygen supplied to the high temperature catalyst with rotation of the crankshaft during the periods A, B.

Definition of Internal Combustion Engine E with Small Displacement for Vehicle

The above catalyst deterioration can generally occur in internal combustion engines incorporated in any type of powertrain system. This catalyst deterioration is significant in powertrain systems using an internal combustion engine with displacement that is small for a vehicle (mainly for vehicle size and weight) (this internal combustion engine is herein sometimes simply referred to as the "internal combustion engine E" for convenience). This is because this internal combustion engine E tends to be frequently in the high load range during its operation. The internal combustion engine 30, which is an engine exclusively for power generation mounted on an REEV, is also an example of the internal combustion engine E.

For example, the internal combustion engine E with small displacement for a vehicle can be defined as follows using various indices such as a brake mean effective pressure BMEP, a catalyst temperature T upon engine start, and an exhaust cover range C/R.

Example of BMEP

The brake mean effective pressure BMEP is obtained by dividing engine torque (shaft torque) by displacement. That is, the brake mean effective pressure BMEP is an index with which the level of engine load can be evaluated regardless of the displacement. The internal combustion engine E can be defined as an engine using a brake mean effective pressure BMEP of 0.8 MPa or higher. REEVs sometimes use an internal combustion engine so as to achieve a brake mean effective pressure BMEP of 0.8 MPa or higher regardless of the engine speed after engine start.

Example of Catalyst Temperature T upon Engine Start

When the engine is frequently in the high load range during its operation, the exhaust temperature is as high as 700° C. or higher upon engine start (upon engine restart such as intermittent engine start). Accordingly, the catalyst temperature (more specifically, the temperature of the start catalyst) T may also become as high as 700° C. or higher (e.g., about 700° C. to 800° C.). The internal combustion engine E can therefore be defined as an engine in which the catalyst temperature T upon engine start can be 700° C. or higher.

Example of Exhaust Cover Range C/R

The exhaust cover range C/R can be given by the following equation (1) based on running resistance R/L (N) at a vehicle speed of 100 km/h, vehicle weight I/W (kg), displacement (cc), motor output (output of vehicle traction motor) (kW), and engine output (kW). The exhaust cover range C/R includes the ratio between the motor output and the engine output and is also applicable to power-split hybrid vehicles and parallel hybrid vehicles. The exhaust cover range C/R of REEVs, series hybrid vehicles, and conventional vehicles including only an internal combustion engine as a driving source can be calculated by substituting zero for the motor output in the equation (1).

$$\text{Exhaust Cover Range } C/R = \frac{\text{Running Resistance } R/L \times \text{Weight } I/W}{136.66 \times \left\{\text{Displacement} \times \left(1 + \frac{\text{Motor Output}}{\text{Engine Output}}\right)\right\}^{1.1613}} \quad (1)$$

The internal combustion engine E can also be defined as an internal combustion engine mounted on a vehicle whose exhaust cover range C/R given by the above equation (1) is 1.5 or more. For reference, in the case where the conventional vehicles and the power-split hybrid vehicles have an internal combustion engine with a displacement of about 1.5 L to 2.5 L, their exhaust cover range C/R is typically about 0.5 to 1.2 according to the equation (1). The calculation results also show that, in the case where the internal combustion engine of the conventional vehicles and the power-split hybrid vehicles is replaced with an internal combustion engine with small displacement to configure REEVs, the exhaust cover range C/R of such REEVs is as high as about 1.9 to 3.1. This means that, when the vehicle body is the same, the exhaust cover range C/R increases as the displacement decreases.

Overview of Control in First Embodiment

In the present embodiment, the control device 70 executes an "early start mode" when the temperature of the catalyst 54 (catalyst temperature T) at the time an engine start request is made is equal to or higher than a threshold Tth. The early start mode is a mode in which the internal combustion engine 30 is started using both a "first start process" and a "second start process" which will be described later. The threshold Tth is an example of the "first threshold" according to the disclosure.

In the internal combustion engine 30, which is an example of the internal combustion engine E with small displacement for a vehicle, the catalyst temperature T can be as high as 700° C. or higher upon engine start, as described above. In the present embodiment, the threshold Tth is therefore set to 700° C. or higher (e.g., 700° C.). However, the threshold Tth may be set to any value required to hinder catalyst deterioration and therefore may be less than 700° C.

When the catalyst temperature T is lower than threshold Tth, the control device 70 executes a "normal start mode." The normal start mode is a mode in which the internal combustion engine 30 is started using neither of the first and second start processes. A specific example of the normal start mode is not particularly limited as long as it uses neither of the first and second start processes. Fuel injection in the normal start mode can be performed using, e.g., the intake asynchronous injection described above.

Details on Various Processes and Controls

Next, a "stop position storage process," the "first and second start processes," and "stop position control" that is performed together with the stop position storage process and the first and second start processes will be sequentially described with reference to FIGS. 4 to 8.

Figure 4:
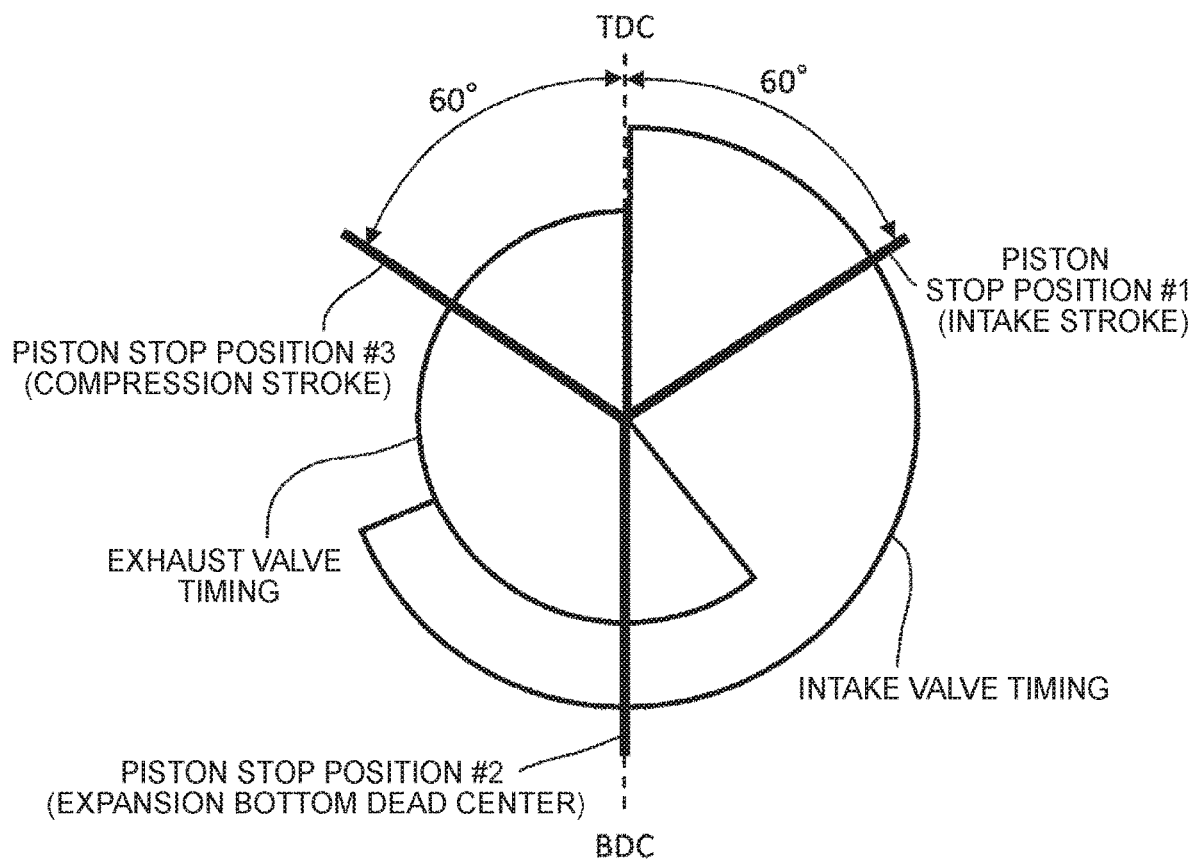
FIG. 4 illustrates an example of the piston stop position of each cylinder together with intake and exhaust valve timings.

FIG. 4 illustrates an example of piston stop positions #1 to #3 of the cylinders 32 #1 to 32 #3 together with intake and exhaust valve timings. In the example of FIG. 4, the intake valve 40 is opened near an exhaust top dead center and is closed in the middle (first half) of a compression stroke. The exhaust valve 42 is opened in the middle (second half) of an expansion stroke and is closed near the exhaust top dead center. The piston stop positions #1 to #3 shown in FIG. 4 correspond to a "crank stop position P1" described later.

A typical rotation behavior of the crankshaft 62 in the course of stopping the engine in response to an engine stop request (i.e., during a period from when the engine speed starts to decrease to when it becomes equal to zero) is as follows. The rotation direction the crankshaft 62 is reversed by the compression pressure of the cylinder 32 that is in the compression stroke immediately before rotation of the crankshaft 62 is stopped. Rotation of the crankshaft 62 is thus stopped when it is rotating in the reverse direction. More specifically, the crankshaft 62 is completely stopped after the piston 34 in this cylinder 32 is no longer subjected to the compression pressure.

In the example of FIG. 4, the cylinder in which the compression pressure causing such reverse rotation is generated is the cylinder 32 #3, and the piston stop position #3 of the cylinder 32 #3 is located in the compression stroke. In the inline three-cylinder internal combustion engine 30, the phase difference between adjacent ones of the cylinders 32 in the firing order is 240° in crank angle. Accordingly, in the internal combustion engine 30, when the piston stop position #3 is located in the second half of the compression stroke as in the example of FIG. 4 (to be precise, unless the piston stop position #3 has been returned to 60° or less after an intake bottom dead center by the compression pressure), the piston stop position #1 of the cylinder 32 #1, which is one cylinder after the cylinder 32 #3 in the firing order, is located in an intake stroke.

As described above, in the example of the piston stop positions illustrated in FIG. 4, the cylinder 32 #3 is stopped in the compression stroke (hereinafter this cylinder is referred to as the "compression stroke cylinder") and the cylinder 32 #1 is stopped in the intake stroke (hereinafter this cylinder is referred to as the "intake stroke cylinder"). Moreover, the cylinder 32 #1 is stopped with the intake valve 40 open. The piston stop position #2 of the remaining cylinder 32 #2 is located at an expansion bottom dead center (the start of the exhaust stroke).

Stop Position Storage Process

The control device 70 executes the "stop position storage process" when the internal combustion engine 30 is stopped. The stop position storage process is a process of storing a stop position of the crankshaft 62 (crank stop position) and is executed on the premise that the first and second start processes are executed. Storing the crank stop position means retaining the crank angle signal of the crank angle sensor (stop position sensor) 60 at the time rotation of the crankshaft 62 is stopped.

As described above, rotation of the crankshaft 62 is stopped when it is rotating in the reverse direction. The "stop position sensor" that detects the crank stop position therefore needs to have a function to detect reverse rotation of the crankshaft 62. Since the crank angle sensor 60 used in the present embodiment has a function to detect reverse rotation, an accurate crank stop position can be detected together with the reverse rotation. The crank stop position stored in the stop position storage process is used for "ignition by the first start process" and "fuel injection and ignition by the second start process" upon intermittent engine start, as described later.

The crankshaft 62 of the internal combustion engine 30 applied to the REEV is coupled to a rotary shaft of MG1. The rotation angle sensor (resolver) 78 has a function to detect reverse rotation. Accordingly, in an example in which the powertrain system includes a crank angle sensor that does not have a function to detect reverse rotation instead of the crank angle sensor 60, the powertrain system may use, e.g., the rotation angle sensor 78 of MG1 as the "stop position sensor" according to the disclosure.

First Start Process

The first start process is executed for a compression stroke cylinder (the cylinder 32 #3 in the example of FIG. 4) while the engine is stopped before an engine start request (intermittent start request) is made.

First, the "fuel injection by the first start process" will be described. This fuel injection is performed using the fuel injection system 46 so that fuel is introduced into the compression stroke cylinder during the last intake stroke that is performed in the course of stopping the engine. An example of how this fuel injection is performed will be described with reference to FIG. 5.

Figure 5:
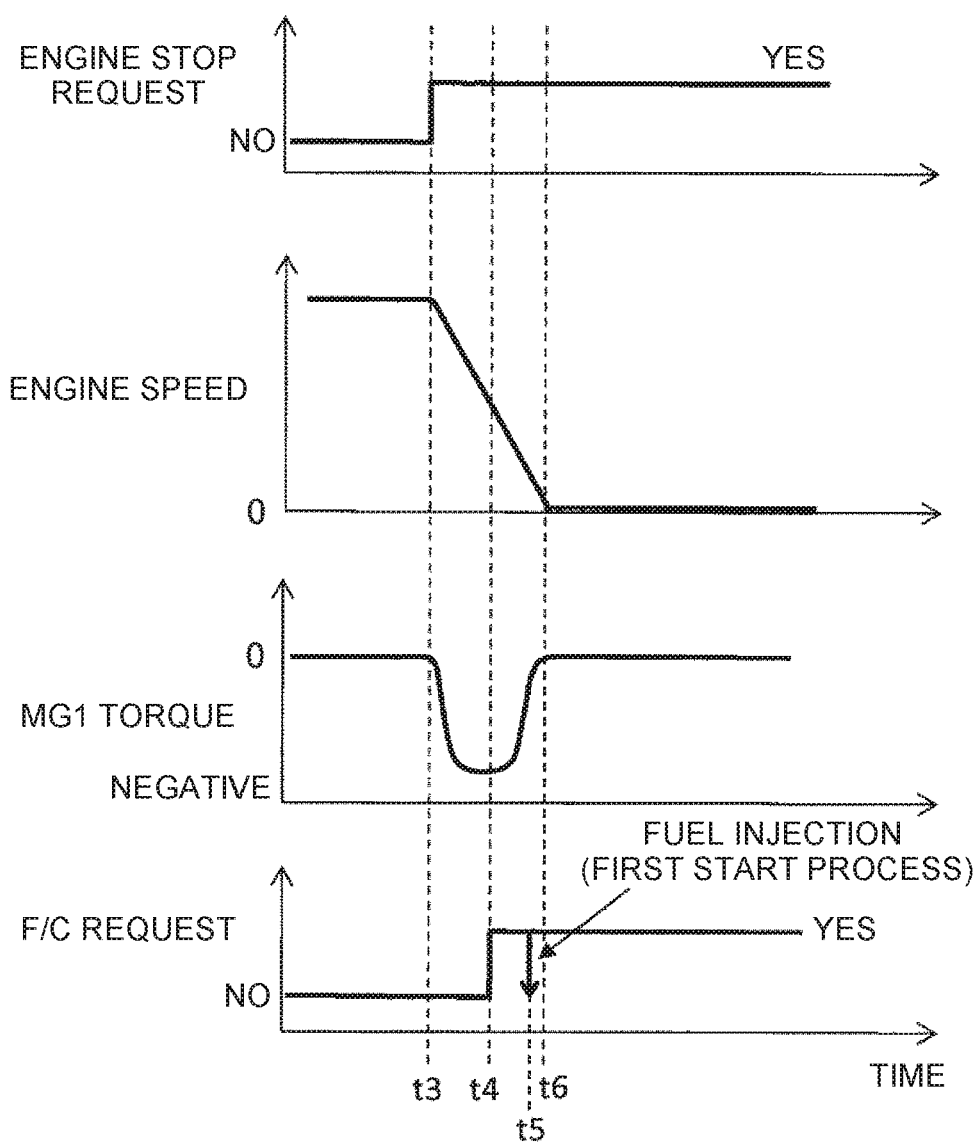
FIG. 5 is a timing chart of an operation that is performed when the engine is stopped according to the first embodiment.

FIG. 5 is a timing chart of an operation that is performed when the engine is stopped in the first embodiment. Time t3 in FIG. 5 corresponds to the time a predetermined engine stop request is made. In the example of FIG. 5, negative torque (braking torque) of MG1 is used to stop rotation of the crankshaft 62 quickly. The negative torque of MG1 starts to be applied to the crankshaft 62 at time t3. The negative torque is obtained by applying a power generation load to MG1. The engine speed decreases as the negative torque is applied to the crankshaft 62.

Time t4 after application of the negative torque to the crankshaft 62 is started corresponds to the time when an F/C request is made, that is, the time when fuel supply to each cylinder 32 starts to be cut off. Time t6 corresponds to the time when rotation of the crankshaft 62 is completely stopped. Time t5 immediately before time t6 corresponds to the timing at which fuel injection by the first start process is started. More specifically, the cylinder that will later become the compression stroke cylinder (32 #3 in the example of FIG. 4) is in the last intake stroke at time t5. Accordingly, fuel can be introduced into this cylinder by performing fuel injection at time t5. This cylinder is then stopped in the compression stroke after the intake valve 40 is closed. The fuel introduced can thus be enclosed in this compression stroke cylinder.

In the internal combustion engine 30 using the port injection fuel injection system 46, fuel can no longer be supplied to the cylinder stopped in the compression stroke. According to the fuel injection method for the first start process of the present embodiment, however, fuel can be supplied into the compression stroke cylinder prior to intermittent engine start. Accordingly, combustion can be started from the first cycle of the compression stroke cylinder upon intermittent engine start.

In the disclosure, the period during which fuel injection is performed so that "fuel is introduced into the compression stroke cylinder during the last intake stroke that is performed in the course of stopping the engine" is not limited to the above example (during the last intake stroke). That is, this fuel injection period may be any period that is after the timing at which the intake valve 40 is closed in the cycle B, which is one cycle before the cycle A to which the last intake stroke belongs, and that is before the timing at which the intake valve 40 is closed in the cycle A.

In the example of FIG. 5, the timing at which fuel starts to be cut off is delayed from the engine stop request by the period from time t3 to time t4. The period during which fuel is cut off is thus adjusted in order for atmospheric gas in the catalyst 54 to have a sufficiently low oxygen concentration while the engine is stopped subsequently. This restrains catalyst deterioration from proceeding while the engine is stopped. In other examples of the engine stop process, fuel may be cut off in response to the engine stop request without applying the negative torque of MG1 to the crankshaft 62 in order to stop rotation of the crankshaft 62 quickly and without adjusting the timing at which fuel starts to be cut off.

Figure 6:
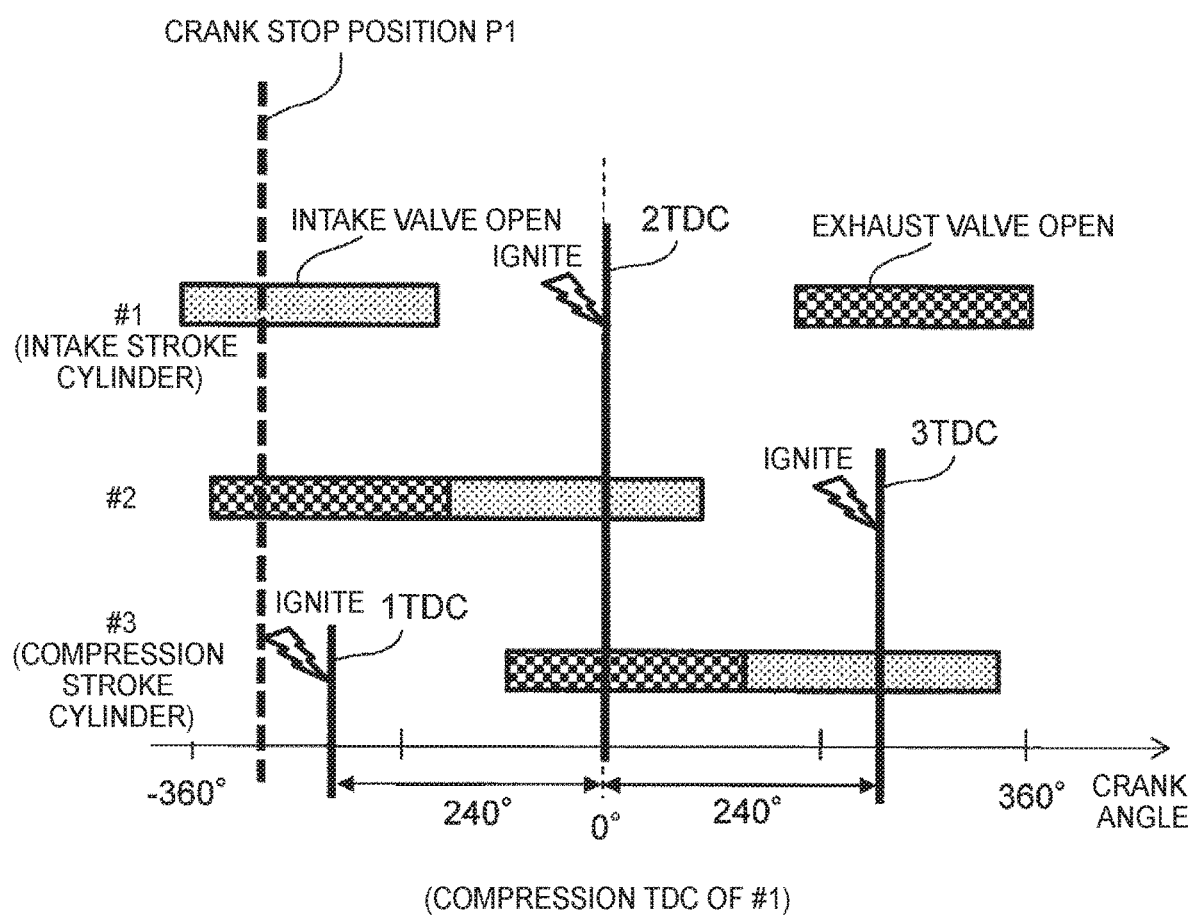
FIG. 6 illustrates the ignition timing of each cylinder upon intermittent engine start from the piston stop positions shown in FIG. 4.

Next, the "ignition by the first start process" will be described. FIG. 6 corresponds to an example of FIG. 4 and illustrates the ignition timing of each cylinder 32 upon intermittent engine start from the piston stop positions #1 to #3 shown in FIG. 4. The zero point of the crank angle on the abscissa in FIG. 6 corresponds to the compression top dead center of the cylinder 32 #1.

The ignition by the first start process is performed based on the crank stop position stored in the stop position storage process. Specifically, the ignition by the first start process is performed using the ignition system 48 in the "first cycle" of the compression stroke cylinder 32 #3 after the start of cranking based on the engine start request (time t0 in FIG. 7 described later). An example of the ignition timing in the first cycle is the compression top dead center. More specifically, this compression top dead center is the first compression top dead center that is reached by any of the cylinders 32 #1 to 32 #3 after the start of cranking, and is also referred to as "1TDC." The ignition timing in the first start process is not limited to 1TDC and may be any other timing within a predetermined crank angle period including 1TDC.

Second Start Process

The fuel injection and ignition by the second start process are performed for the intake stroke cylinder specified based on the crank stop position stored in the stop position storage process (the cylinder 32 #1 in the example of FIG. 4).

Figure 7:
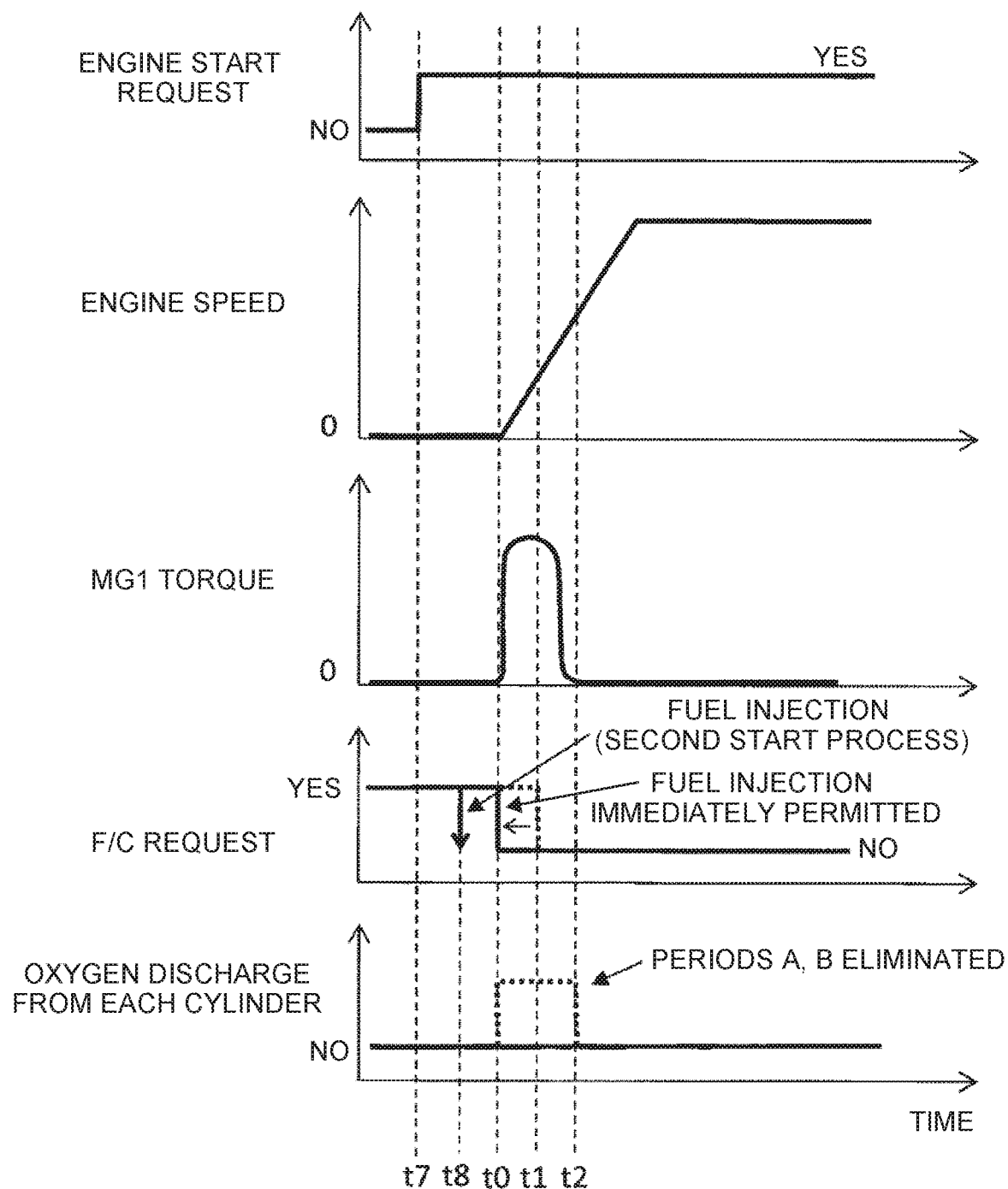
FIG. 7 is a timing chart of an operation that is performed upon intermittent engine start according to the first embodiment.

First, the "fuel injection by the second start process" will be described. FIG. 7 is a timing chart of an operation that is performed upon intermittent engine start in the first embodiment. The waveforms of the engine speed and the MG1 torque in FIG. 7 are similar to those in the comparative example shown in FIG. 3.

The intermittent engine start in the powertrain system 10 mounted on the REEV is based on a power generation request, not a request from the driver of the vehicle. Accordingly, the timing at which an intermittent engine start request is made can be managed by the powertrain system 10. The control device 70 can therefore determine as desired the timing at which the internal combustion engine 30 is to be started after the intermittent engine start request is made. As shown in FIG. 7, in the present embodiment, in the case where the engine start request is made at time t7, the fuel injection by the second start process is performed while the engine is stopped before the start of cranking (time t0). Time t8 corresponds to the timing at which this fuel injection is started.

Figure 8:
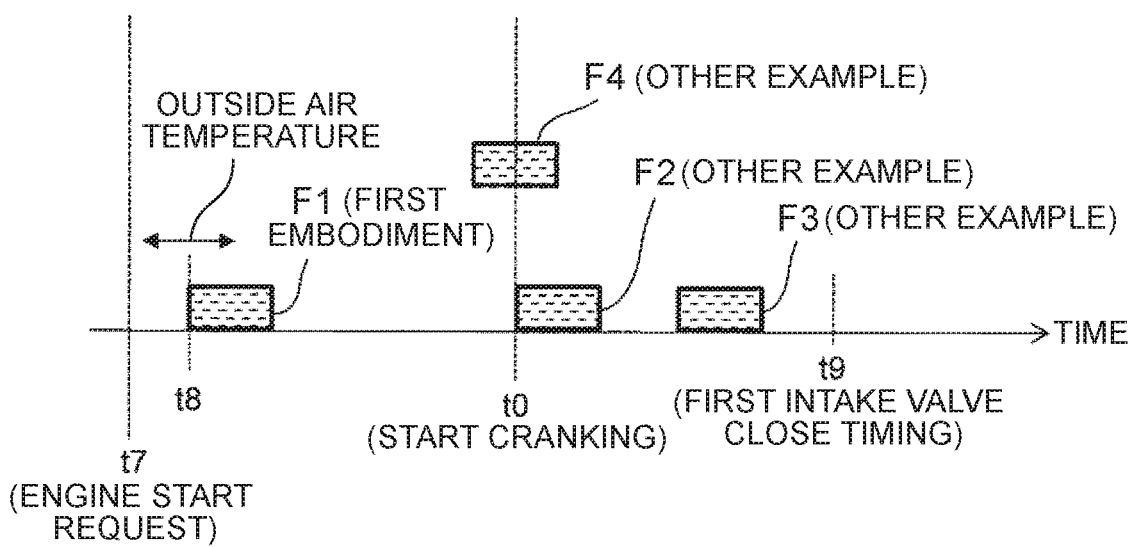
FIG. 8 is a timing chart illustrating an example of a fuel injection period that can be used in a second start process.

FIG. 8 is a timing chart illustrating an example of a fuel injection period that can be used in the second start process. In FIG. 8, the area denoted with "F1" indicates the fuel injection period in the second start process used in the first embodiment. Although the timing t8 at which the fuel injection period F1 is started may be fixed, the timing t8 is changed according to the outside air temperature in the present embodiment. Specifically, when the outside air temperature is low, the temperature of air stagnating in the intake port 36a while the engine is stopped and the temperature of the wall surface of the intake port 36a become low. Accordingly, when the outside air temperature is low, fuel injected into the intake port 36a is less likely to vaporize. In the present embodiment, the timing t8 at which the fuel injection is started is advanced when the outside air temperature (more specifically, the outside air temperature at the time when the engine start request is made) is low as compared to when the outside air temperature is high.

The fuel injection period that can be used in the second start process may be "any period from the time t8 when the engine start request (intermittent engine start request) is made to the first timing t9 at which the intake valve 40 is closed after the start of cranking (from t8 to t9)." Accordingly, the fuel injection period may be, e.g., any of fuel injection periods F2 to F4 shown in FIG. 8 instead of the fuel injection period F1 that is while the engine is stopped. The fuel injection period F2 is started in synchronization with the start of cranking (in other words, simultaneously with the start of cranking). The fuel injection period F3 is set within the first period during which the intake valve 40 is open after the start of cranking. When the fuel injection period F2 or F3 is selected, fuel can be supplied to the intake stroke cylinder from the first cycle after the start of cranking by using intake synchronous injection. The intake synchronous injection herein means that the fuel injection period is synchronous with the period during which the intake valve 40 is open. When the fuel injection period F2 or F3 is selected, cranking may be started immediately after the engine start request is made. Alternatively, the fuel injection period F4 may be used. The fuel injection period F4 is set so as to include the time t0 when cranking is started.

By performing the fuel injection by the second start process while the engine is stopped, the fuel vaporization time is also increased as compared to the case where the fuel injection by the second start process is performed after the start of cranking. The timing t8 at which the fuel injection is started may be changed according to the outside air temperature not only before the start of cranking (while the engine is stopped) but also at and after the start of cranking (the period t0 to t9).

Next, the "ignition by the second start process" will be described. As shown in FIG. 6, the ignition by the second start process is performed using the ignition system 48 in the "first cycle" of the intake stroke cylinder 32 #1 after the start of cranking. An example of the ignition timing in the first cycle is the compression top dead center.

More specifically, this compression top dead center is the second compression top dead center that is reached by any of the cylinders 32 #1 to 32 #3 after the start of cranking, and is also referred to as "2TDC." The ignition timing in the second start process is not limited to 2TDC and may be any other timing within a predetermined crank angle period including 2TDC.

Fuel injection in the cycle of the cylinder 32 #2 that reaches the ignition timing (3TDC in FIG. 6) after the intake stroke cylinder and in the following cycles is performed using, e.g., the above intake asynchronous injection in a manner similar to that in a method that is commonly used upon engine start. More specifically, the fuel injection in these cycles is sequentially performed after the F/C request is cancelled at time t0 in FIG. 7 (that is, after fuel injection is permitted).

Stop Position Control

The actual crank stop position varies due to various factors. In inline three-cylinder engines, however, the probability that such a crank stop position that attains the piston stop positions #1 to #3 as in the example of FIG. 4 (this crank stop position is herein referred to as the "crank stop position P1" for convenience) is achieved is essentially high due to the compression pressure that is applied immediately before the crankshaft 62 is stopped as described above. At the crank stop position P1, the piston 34 of the compression stroke cylinder 32 #3 and the piston 34 of the intake stroke cylinder 32 #1 are stopped symmetrically with respect to the top dead center (TDC) in FIG. 4. In other words, at the crank stop position P1, the piston stop position #3 of the compression stroke cylinder 32 #3 is 60° before the compression top dead center in crank angle, and the piston stop position #1 of the intake stroke cylinder 32 #1 is 60° after the exhaust top dead center in crank angle.

It is desirable to reliably achieve the crank stop position P1 in order to reliably obtain the compression stroke cylinder and the intake stroke cylinder which are required to execute the first and second start processes. In order to execute the first and second start processes, it is therefore preferable that the probability the crankshaft 62 is stopped at or near the crank stop position P1 is high. Accordingly, in the present embodiment, the control device 70 additionally performs the "stop position control" as described below.

The stop position control is control in which a "rotating electrical machine" is controlled so that the crank stop position is located within a "predetermined range" required to execute the first and second start processes. This rotating electrical machine is coupled to the crankshaft 62. In the present embodiment, MG1 is used as an example of the rotating electrical machine. The rotating electrical machine refers to an element that functions either or both of a motor and a generator (i.e., a motor generator).

An example of the "predetermined range" is a predetermined crank angle range R (that is, the crank stop position P1 and positions near the crank stop position P1) with respect to the crank stop position P1 as a reference position. Moreover, basic requirements that specify the crank angle range R are that the compression stroke cylinder and the intake stroke cylinder must be obtained in the crank angle range, that the intake valve 40 must be closed at the piston stop position of the compression stroke cylinder, and that the intake valve 40 must be open at the piston stop position of the intake stroke cylinder.

For example, the stop position control of the present embodiment is performed by adjusting the negative torque of MG1 in the course of stopping the engine. As described above with reference to FIG. 5, in the present embodiment, the negative torque (braking torque) of MG1 is applied to the crankshaft 62 in the course of stopping the engine in order to stop rotation of the crankshaft 62 quickly. The waveform of the negative torque shown in FIG. 5 includes the negative torque that is applied by the stop position control immediately before the engine stops. More specifically, the magnitude of the negative torque that is applied by the stop position control and the timing at which the application of this negative torque is started can be determined so as to be suitable for stopping the piston 34 of each cylinder 32 at the crank stop position P1 by, e.g., experiments etc. conducted in advance.

Moreover, which cylinders are going to be the compression stroke cylinder and the intake stroke cylinder can essentially vary unless a special process such as the stop position control is performed. Since the stop position control of the present embodiment is performed to achieve a specific crank stop position as a target position, which of the cylinders 32 #1 to 32 #3 are going to be the compression stroke cylinder or the intake stroke cylinder can be determined in advance. Specifically, for example, in the case where the crank stop position P1 shown in FIG. 4 is a target position, the stop position control can be performed so that the cylinder 32 #3 will be the compression stroke cylinder and the cylinder 32 #1 will be the intake stroke cylinder.

The above stop position control increases the probability that the piston 34 of each cylinder 32 is stopped at or near the crank stop position P1.

The method that increases the probability that the crankshaft 62 is stopped at the crank stop position P1 by using the negative torque of MG1 in the course of stopping the engine is described above as an example of the stop position control. However, a specific example of the stop position control is not particularly limited to this. For example, a method in which the crankshaft 62 is driven to the crank stop position P1 using MG1 as an electric motor while the engine is stopped may be used as the stop position control. This method requires power consumption of MG1 but can reliably achieve the crank stop position P1.

Process by Control Device

Next, a process will be described which is executed by the ECU 72 of the control device 70 when the engine is stopped or upon intermittent engine start in order to reduce entry of oxygen into the catalyst 54.

When the Engine is Stopped

Figure 9:
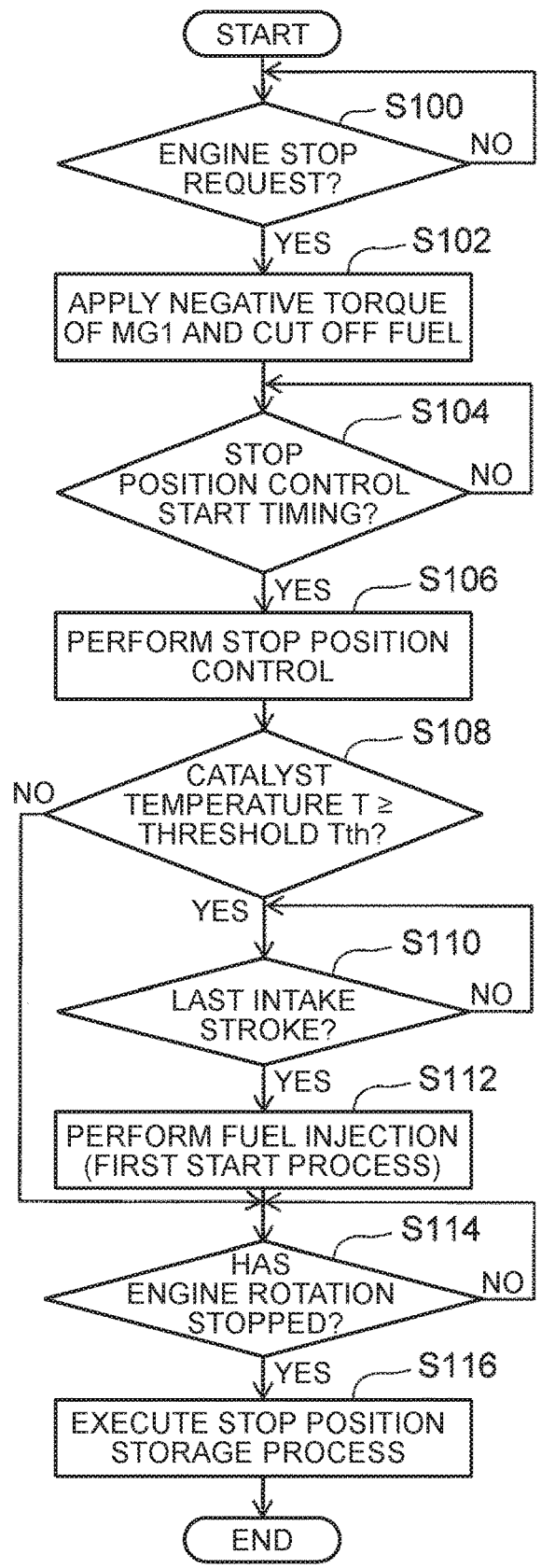
FIG. 9 is a flowchart of a process related to control that is performed when the engine is stopped according to the first embodiment.

FIG. 9 is a flowchart of a process related to control that is performed when the engine is stopped according to the first embodiment. This process is started while the internal combustion engine 30 is in operation (while electric power is being generated using the internal combustion engine 30).

The ECU 72 first determines in step S100 whether there is an engine stop request. Whether there is an engine stop request is determined based on whether a predetermined engine stop condition such as completion of charging of the battery 16 (SOC≥predetermined upper limit) is satisfied. An engine stop request is made either while the vehicle is running or while the vehicle is temporarily stopped. As long as the determination result of step S100 is No, step S100 is repeated and the engine is kept operated.

When there is an engine stop request, the routine proceeds to step S102. In step S102, the ECU 72 executes a process for stopping the internal combustion engine 30. Specifically, the ECU 72 controls MG1 using the PCU 74 so that negative torque of MG 1 (see FIG. 5) is applied to the crankshaft 62. In step S102, the ECU 72 also controls the fuel injection system 46 so that fuel is cut off (F/C) at a preset fuel cutoff start timing.

Next, the ECU 72 determines in step S104 whether it is the timing at which the stop position control is started. When it is the timing at which the stop position control is started (a predetermined timing at which application of the negative torque is started), the routine proceeds to step S106. In step S106, the ECU 72 starts the stop position control using the negative torque of MG1. For example, the stop position control is performed until rotation of the crankshaft 62 is reversed immediately before rotation of the crankshaft 62 is stopped.

The ECU 72 then determines in step S108 whether the catalyst temperature T is equal to or higher than the threshold Tth. For example, the catalyst temperature T is obtained using the catalyst temperature sensor 56. However, for example, the following various estimation methods may be used to obtain the catalyst temperature T at the time the engine is stopped. The catalyst temperature T and the engine coolant temperature correlate with each other. Accordingly, a map (not shown) that defines the relationship between the catalyst temperature T and the engine coolant temperature may be stored in advance, and the catalyst temperature T corresponding to the engine coolant temperature detected by the coolant temperature sensor 58 may be obtained from the map. The catalyst temperature T may be obtained using a known estimation method based on the operation history of the internal combustion engine 30 immediately before the engine is stopped.

When the determination result of step S108 is No (catalyst temperature T<threshold Tth), the routine proceeds to step S114 (that is, fuel injection for the first start process is not performed). When the determination result of step S108 is Yes (catalyst temperature T threshold Tth), the routine proceeds to step S110.

The ECU 72 determines in step S110 whether the cylinder that is to be the compression stroke cylinder while the engine is stopped has reached the last intake stroke. As described above, in the stop position control used in the present embodiment, the negative torque is applied to the crankshaft 62 so that a specific one of the cylinders will be the compression stroke cylinder. In FIG. 4, an example of the specific cylinder is the cylinder 32 #3. Although a method for determining whether the specific cylinder 32 #3 has reached the last intake stroke is not particularly limited, an example of the method is as follows. At each timing at which the cylinder 32 #3 reaches the intake stroke (exhaust top dead center), the ECU 72 determines whether the engine speed has fallen below a predetermined value TH1. The predetermined value TH1 is determined in advance and is such a value that when the engine speed at the above timing is lower than this value, it can be determined that the cylinder 32 #3 will not be able to exceed the compression top dead center immediately after this exhaust top dead center. When the ECU 72 determines that the engine speed has fallen below the predetermined value TH1, it determines that the cylinder 32 #3 has reached the last intake stroke.

When the determination result of step S110 is Yes, the routine proceeds to step S112. In step S112, the ECU 72 controls the fuel injection system 46 so that the fuel injection by the first start process is performed for the compression stroke cylinder 32 #3. Fuel thus injected is introduced into the cylinder 32 #3 and is then enclosed in the compression stroke cylinder 32 #3 until the next intermittent engine start.

Subsequently, in step S114, the ECU 72 uses the crank angle sensor 60 to determine whether engine rotation has stopped. When the ECU 72 determines in step S114 that engine rotation has stopped, the routine proceeds to step S116. In step S116, the ECU 72 executes the stop position storage process to store in the memory 72b the crank stop position detected using the crank angle sensor 60.

Unlike the example illustrated in FIG. 9, the stop position control and the stop position storage process may also be performed only when the catalyst temperature T is equal to or higher than the threshold Tth.

Upon Intermittent Engine Start

Figure 10:
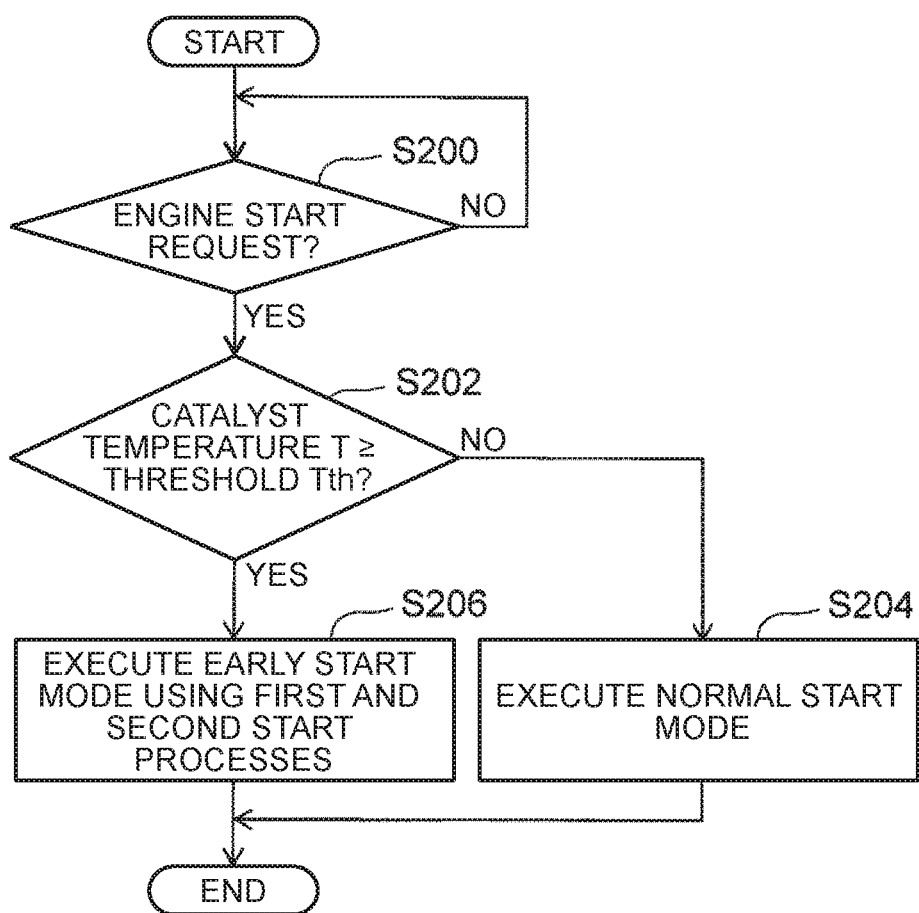
FIG. 10 is a flowchart of a process related to control that is performed upon intermittent engine start according to the first embodiment.

FIG. 10 is a flowchart of a process related to control that is performed upon intermittent engine start according to the first embodiment. This process is started while the internal combustion engine 30 is stopped.

The ECU 72 first determines in step S200 whether there is an engine start request (intermittent engine start request). Whether there is an engine start request is determined based on whether a predetermined engine start condition such as there being a request to charge the battery 16 (SOC predetermined lower limit) is satisfied. As long as the determination result of step S200 is No, step S200 is repeated and the engine is kept in the stopped state.

When there is an engine start request, the routine proceeds to step S202. The ECU 72 determines in step S202 whether the catalyst temperature T is equal to or higher than the threshold Tth. For example, the catalyst temperature T at the time engine start is requested is also obtained using the catalyst temperature sensor 56. However, for example, the following estimation method may be used to obtain the catalyst temperature T at the time engine start is requested (that is, the catalyst temperature T while the engine is stopped).

First, like the catalyst temperature T at the time the engine is stopped, the catalyst temperature T may be estimated using the engine coolant temperature. After the engine is stopped, the catalyst temperature T basically decreases as the engine stop period increases. Accordingly, a map (not shown) that defines the relationship between the engine stop period and the amount of decrease in catalyst temperature T after the engine is stopped is stored in advance. The catalyst temperature T at the time engine start is requested may be obtained based on the estimated value of the catalyst temperature T at the time the engine is stopped as described in step S108 and the amount of decrease obtained from this map. For example, the engine stop period can be obtained using a timer function of the ECU 72. Whether the catalyst temperature T is equal to or higher than the threshold Tth may be determined using the engine stop period instead of step S202. Specifically, the ECU 72 may determine that the catalyst temperature T is equal to or greater than the threshold Tth when the engine stop period is equal to or less than a predetermined value.

When the determination result of step S202 is No (catalyst temperature T<threshold Tth), the routine proceeds to step S204. In step S204, the ECU 72 executes the normal start mode. The crank stop position stored by the stop position storage process in step S116 may be used in order to omit the cylinder identification process at the start of the normal start mode.

When the determination result of step S202 is Yes (catalyst temperature T threshold Tth), the routine proceeds to step S206. In step S206, the ECU 72 executes the early start mode that uses the first and second start processes. The crank stop position stored by the stop position storage process in step S116 is used to perform the ignition by the first start process and the fuel injection and ignition by the second start process.

More specifically, in the present embodiment, for example, the fuel injection by the second start process is performed while the engine is stopped (see FIG. 7). The ECU 72 therefore performs the fuel injection before the start of cranking. The timing at which the fuel injection is started (time t8) is changed according to the outside air temperature as described above. The ECU 72 then performs cranking using MG1. When 1TDC (see FIG. 6) is reached after the start of cranking, the ECU 72 causes ignition in the compression stroke cylinder 32 #3 to which fuel has already been supplied when the engine is stopped. When 2TDC (see FIG. 6) is reached thereafter, the ECU 72 causes ignition in the intake stroke cylinder 32 #1. The ECU 72 also performs the intake asynchronous injection and the ignition in cycles during engine start which are the cycle including 3TDC (see FIG. 6) and the subsequent cycles.

In the case where the routine proceeds to step S206, the ECU 72 terminates the early start mode when the crank stop position stored by the stop position storage process is not within the crank angle range R described above. In this case, for example, the ECU 72 may execute the normal start mode instead of the early start mode.

Effects

According to the powertrain system 10 of the first embodiment described above, the early start mode using the first and second start processes is executed when the catalyst temperature T is equal to or higher than the threshold Tth at the time engine start is requested.

The early start mode uses the crank stop position stored by the stop position storage process. Accordingly, the period A (see FIG. 3) for cylinder identification is not required upon intermittent engine start, as shown in FIG. 7. As a result, entry of oxygen into the catalyst 54 due to the presence of the period A is reduced (avoided). Moreover, the ignition (ignition at 1TDC) by the first start process and the fuel injection and ignition (ignition at 2TDC) by the second start process can be performed using stored information on the crank stop position.

According to the first start process, combustion is performed from the first cycle of the compression stroke cylinder 32 #3, so that burned gas can be immediately supplied to the catalyst 54. Similarly, according to the second start process, combustion is performed from the first cycle of the intake stroke cylinder 32 #1, so that burned gas can be supplied to the catalyst 54. The period B (see FIG. 3) is thus also eliminated as shown in FIG. 7. As a result, entry of oxygen into the catalyst 54 due to the presence of the period B (that is, the intake asynchronous injection) is reduced (avoided).

According to the early start mode of the present embodiment, catalyst deterioration is effectively reduced as entry of oxygen into the catalyst 54 is reduced when the engine is started (intermittent start) under the condition that the catalyst temperature T is high. There is a technique in which the catalyst temperature T is reduced by performing low load operation after engine stop is requested or reducing the number of intermittent engine stops in order to reduce catalyst deterioration. However, when such a technique is used, the engine is kept operated even in a situation where the engine should be stopped. According to the present embodiment, catalyst deterioration is reduced while avoiding the engine from being kept operated in such a situation.

When the first and second start processes are executed, combustion is performed in the first cycle of the compression stroke cylinder and the intake stroke cylinder (that is, immediately after the start of cranking during which the engine speed is low and combustion tends to be unstable). Accordingly, the normal start mode that does not use the first and second start processes is better than the early start mode in terms of vibration noise upon engine start. In the present embodiment, the normal start mode that does not use the first and second start processes is therefore executed when the catalyst temperature T is lower than the threshold Tth (that is, when oxygen flowing into the catalyst does not affect or hardly affects catalyst deterioration). Since the different start modes are thus used according to the catalyst temperature T, both reduction in deterioration of the catalyst 54 and reduction in vibration noise upon engine start can be suitably achieved.

In the present embodiment, the first and second start processes are executed together with the stop position control. This increases the probability that the crankshaft 62 is stopped at a crank stop position suitable for executing the first and second start processes like the crank stop position P1 shown in FIG. 4. This reliably creates an opportunity to execute the early start mode in which the first and second start processes are satisfactorily performed.

In the present embodiment, the timing at which the fuel injection by the second start process is started is advanced when the outside air temperature is low as compared to when the outside air temperature is high. In other words, the timing at which the fuel injection by the second start process is started is advanced as the outside air temperature is lowered. This provides a long fuel vaporization time before the injected fuel is subjected to combustion when the outside air temperature is low. Moreover, an appropriate vaporization time for the fuel injected by the second start process is ensured according to the outside air temperature. Moreover, since the internal combustion engine 30 is an engine exclusively for power generation, the crankshaft 62 is not rotated with rotation of the wheels 18. Accordingly, the timing of this fuel injection can be changed according to the outside air temperature even while the vehicle is running. The timing of this fuel injection can be changed according to the outside air temperature even in hybrid vehicles having a series hybrid mode, which will be described later, in which the internal combustion engine is not exclusively for power generation.

Modifications

In the first embodiment, the early start mode uses both the first and second start processes. Alternatively, the early start mode may use only one of the first and second start processes. Even by performing only one of the first and second start processes, oxygen is avoided from being discharged in the exhaust stroke of the first cycle of the compression stroke cylinder or the intake stroke cylinder. Entry of oxygen into the catalyst 54 is thus effectively reduced.

Unlike the first embodiment, the early start mode may be executed without performing the stop position control. In the example in which the stop position control is not performed, the last intake stroke of the compression stroke cylinder for which the fuel injection by the first start process should be performed when the engine is stopped can be specified by using, e.g., the following method. Each time each cylinder 32 reaches the intake stroke in the course of stopping the engine (exhaust top dead center), the ECU 72 determines whether the engine speed has fallen below the predetermined value TH1 (see step S110). When the result of this determination is Yes, the ECU 72 determines that the cylinder having reached the intake stroke this time is the cylinder that will later be the compression stroke cylinder and this is the last intake stroke for this cylinder. The ECU 72 then performs fuel injection for this intake stroke.

Second Embodiment

Next, a second embodiment of the disclosure will be described with reference to FIG. 11.

Overview

The second embodiment is directed to the powertrain system 10 having the configuration shown in FIGS. 1 and 2. Control that is performed upon engine start (intermittent engine start) in the second embodiment is different from the first embodiment in the early start mode as described below.

Specifically, in the first embodiment, when the catalyst temperature T is equal to or higher than the threshold Tth, the early start mode using both the first and second start processes is executed regardless of the vehicle speed. In the early start mode of the second embodiment, on the other hand, either or both of the first and second start processes are used based on the vehicle speed and the remaining charge level (SOC) of the battery 16, as described below with reference to FIG. 11.

Process by Control Device

Figure 11:
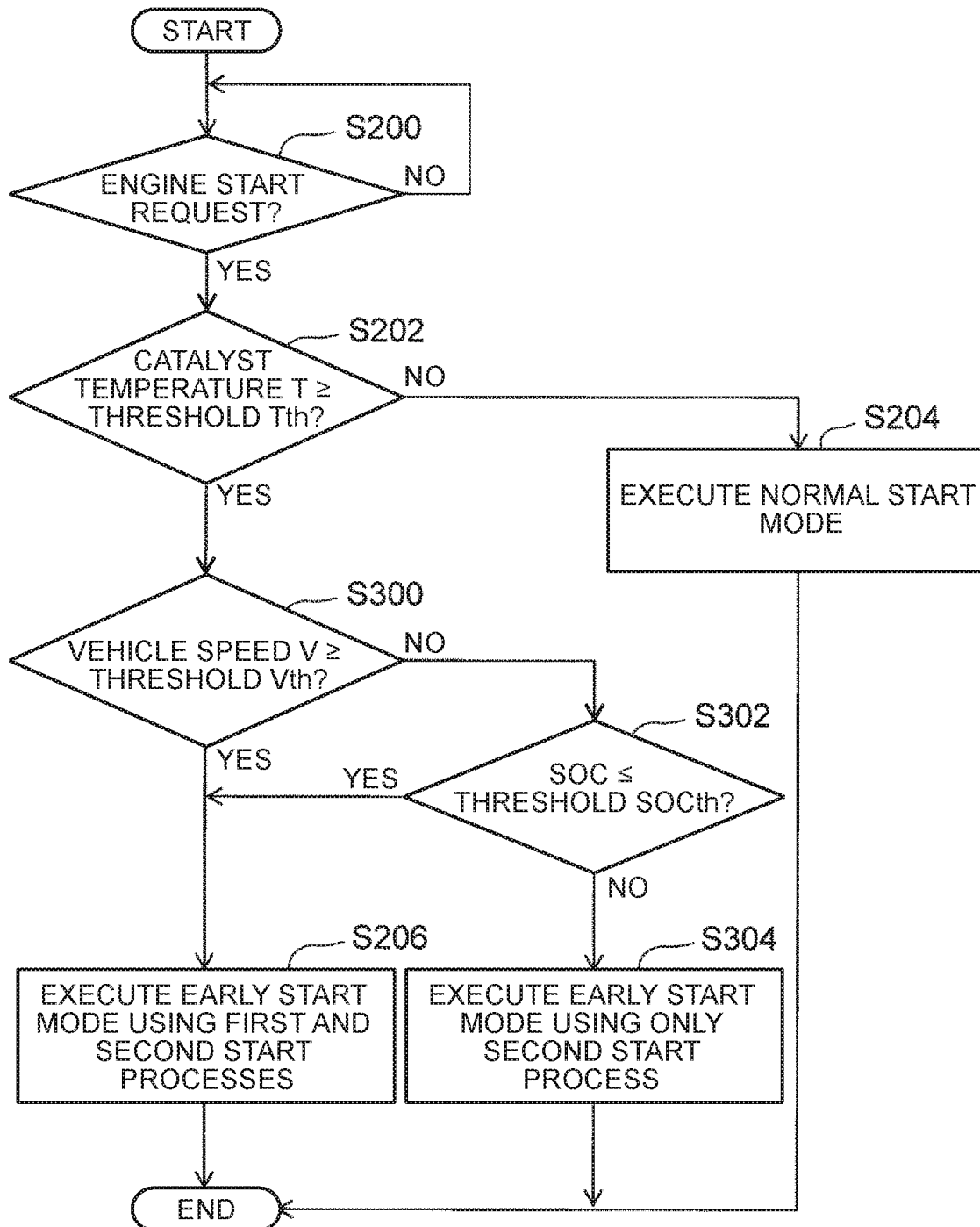
FIG. 11 is a flowchart of a process related to control that is performed upon intermittent engine start according to a second embodiment.

FIG. 11 is a flowchart of a process related to control that is performed upon intermittent engine start according to the second embodiment. Steps S200 to S206 in FIG. 11 are as described above in the first embodiment. In the present embodiment, the process illustrated in the flowchart of FIG. 9 is used as an example of the process related to control that is performed when the engine is stopped.

In the present embodiment, as shown in FIG. 11, the routine proceeds to S300 when the determination result of step S202 is Yes (catalyst temperature T threshold Tth). The ECU 72 determines in step S300 whether the vehicle speed V is equal to or higher than a predetermined threshold Vth. When the vehicle speed V is equal to or higher than the threshold Vth, the routine proceeds to step S206 similar to the first embodiment. The threshold Vth is an example of the "second threshold" according to the disclosure.

When the determination result of step S300 is No (vehicle speed V<threshold Vth), the routine proceeds to step S302. The ECU 72 determines in step S302 whether the remaining charge level (SOC) of the battery 16 is equal to or less than a predetermined threshold SOCth. For example, the SOC can be obtained (calculated) by measuring a current flowing into and out of the battery 16 using the current sensor 82 and integrating the measured current over time. The threshold SOCth is an example of the "third threshold" according to the disclosure.

When the determination result of step S302 is No (SOC>threshold SOCth), the routine proceeds to step S304. In step S304, the ECU 72 executes the early start mode using only the second start process.

When the determination result of step S302 is Yes (SOC≤threshold SOCth), the routine proceeds to step S206. In step S206, the ECU 72 executes the early start mode using both the first and second start processes.

Effects

One way to reduce the vibration noise upon engine start described above in the first embodiment is to minimize the use of the first and second start processes. In this regard, in the early start mode of the present embodiment, both the first and second start processes are executed when the vehicle speed V is equal to or higher than the threshold Vth. When the vehicle speed V is lower than the threshold Vth, only the second start process is executed (the first start process is not used) on the condition that the remaining charge level of the battery 16 is still high enough (SOC>threshold SOCth). In the present embodiment, the use of both the first and second start processes is permitted when the vehicle speed V is high, that is, when background noise in a passenger compartment is loud due to road noise etc. Both reduction in deterioration of the catalyst 54 and reduction in transmission of engine vibration noise to an occupant(s) in the passenger compartment are suitably achieved.

In the early start mode of the present embodiment, even when the vehicle speed V is lower than the threshold Vth, both the first and second start processes are executed when the remaining charge level of the battery 16 is low (SOC≤threshold SOCth). When both the first and second start processes are executed, the engine torque that is generated by combustion in the first cycle of the compression stroke cylinder can also be used to increase the engine speed, unlike the case where only the second start process is executed. This leads to saving of power consumption required to drive MG1 for cranking. In other words, when the remaining charge level of the battery 16 is low, reduction in power consumption is prioritized over reduction in transmission of vibration noise. Reduction in catalyst deterioration and reduction in transmission of engine vibration noise are thus suitably achieved while more appropriately managing the remaining charge level of the battery 16.

Modifications

The early start mode of the second embodiment is changed according to the vehicle speed V and the remaining charge level (SOC) of the battery 16. Alternatively, the early start mode may be changed without considering the remaining charge level of the battery 16. More specifically, the first and second start processes may be performed when the vehicle speed V is equal to or higher than the threshold Vth, and only the second start process may be performed when the vehicle speed V is lower than the threshold Vth.

In another example of the early start mode, the first start process may be performed instead of the second start process when the vehicle speed V is lower than the threshold Vth and the remaining charge level (SOC) of the battery 16 is higher than the threshold SOCth. The same applies to when the vehicle speed V is lower than the threshold Vth in the example in which the remaining charge level of the battery 16 is not considered.

Other Embodiments

As described below, the powertrain system according to the disclosure may also be configured to be used for vehicles of any drive type other than REEVs. Catalyst deterioration is more suitably reduced in each vehicle illustrated below in the case where an internal combustion engine mounted on the vehicle is the internal combustion engine E. The internal combustion engine that is applicable to the powertrain system according to the disclosure is not limited to the inline three-cylinder internal combustion engine as described below.

Other Configuration Examples of Powertrain System

The powertrain system according to the disclosure may be configured for, e.g., series hybrid vehicles. In terms of the hardware configuration, the powertrain system for the series hybrid vehicles includes a vehicle traction motor (second electric motor), an engine exclusively for power generation, and a motor generator, like the powertrain system for the REEVs. The series hybrid vehicles as used herein may have a plug-in function for external charging.

The powertrain system according to the disclosure may also be configured for, e.g., hybrid vehicles whose internal combustion engine is not an engine exclusively for power generation but which has a series hybrid mode (i.e., a mode in which the vehicle is driven by the second electric motor while generating electric power using the internal combustion engine and the motor generator). The powertrain system according to the disclosure is also applicable to the power-split hybrid vehicles or the parallel hybrid vehicles. These types of hybrid vehicles may also have a plug-in function for external charging.

The powertrain system according to the disclosure may also be configured for the conventional vehicles including only an internal combustion engine as a driving source. In the conventional vehicles, a starter motor (not shown) is an example of the "first electric motor" according to the disclosure. In the case where the "stop position control" described in the first embodiment is performed in a similar manner in the conventional vehicles, an alternator (not shown) can be used as an example of the "rotating electrical machine" according to the disclosure. In another example of the stop position control in the conventional vehicles, the crank stop position may be adjusted using the starter motor while the engine is stopped, although this adjustment is made in one direction. In this example, the starter motor is an example of the "rotating electrical machine" according to the disclosure. The conventional vehicles may have a start-stop function, namely a function to intermittently stop the internal combustion engine. Moreover, the "early start mode" according to the disclosure may be executed not only upon intermittent engine start but also upon engine start based on a switch operation by the driver of the vehicle.

Applications to Internal Combustion Engines of Types Other Than Inline Three-Cylinder Type The number of cylinders of the internal combustion engine that is applicable to the powertrain system according to the disclosure is not limited to three, and may be one, two, or four or more. The cylinder arrangement is not limited to the inline arrangement, and may be, e.g., V-arrangement, horizontally opposed arrangement, or W-arrangement.

When the "stop position control" according to the disclosure is performed in an inline four-cylinder engine, the rotating electrical machine may be controlled so that, e.g., the crank stop position is located within a predetermined crank angle range with respect to a crank stop position P2 as a reference position (the predetermined crank angle range is another example of the "predetermined range" according to the disclosure). The crank stop position P2 will be described later.

Figure 12:
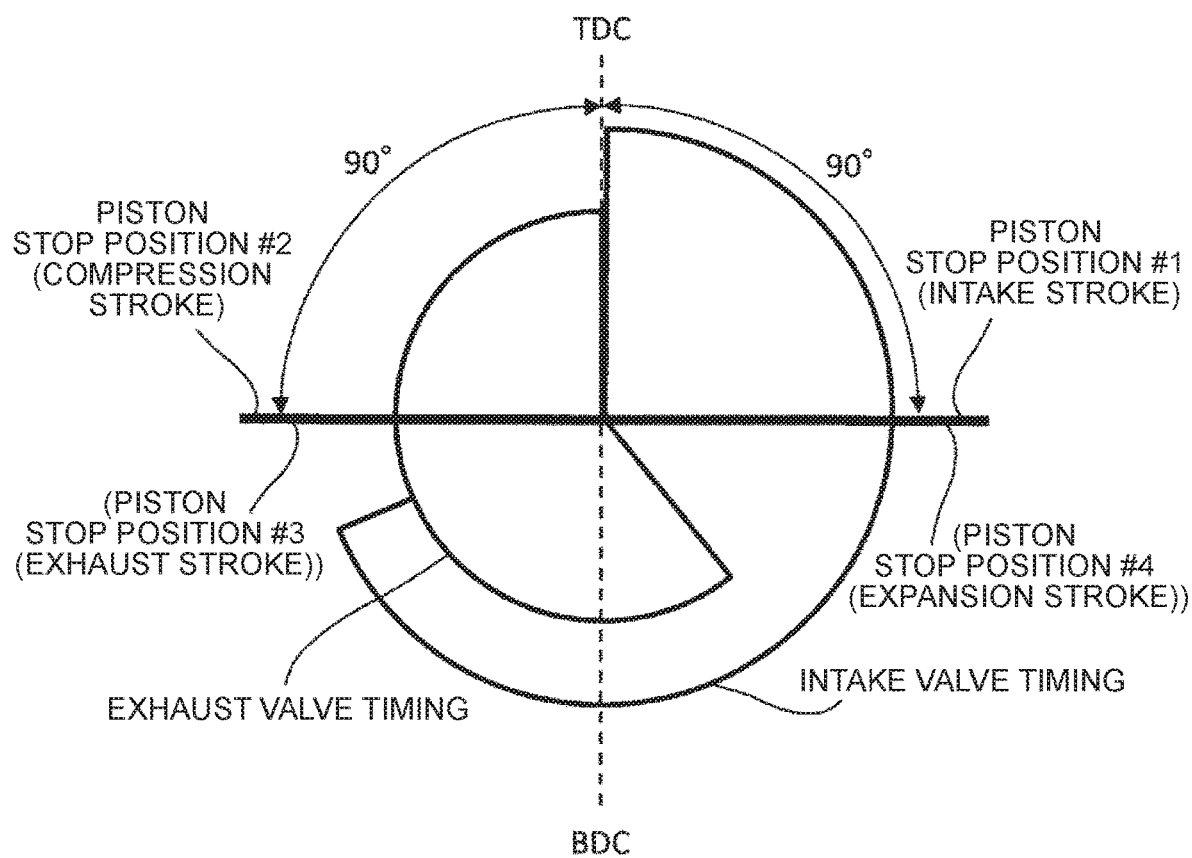
FIG. 12 illustrates an example of piston stop positions of four cylinders of an inline four-cylinder engine together with intake and exhaust valve timings.

FIG. 12 illustrates an example of piston stop positions #1 to #4 of four cylinders of the inline four-cylinder engine together with intake and exhaust valve timings. When the cylinders are sequentially numbered #1 to #4 from one end in the inline direction, the firing order of the illustrated inline four-cylinder engine (not shown) is, e.g., the cylinders #1, #3, #4, and #2. The phase difference between adjacent ones of the cylinders in the firing order is 180° in crank angle.

The example of the piston stop positions #1 to #4 in FIG. 12 shows the crank stop position P2 that is desirable to perform the first and second start processes according to the disclosure in the inline four-cylinder engine. In this example as well, as in the example shown in FIG. 4, the compression stroke cylinder #2 and the intake stroke cylinder #1 are stopped symmetrically with respect to the top dead center (TDC) in FIG. 12. In other words, at the crank stop position P2, the piston stop position #2 of the compression stroke cylinder #2 is 90° before the compression top dead center in crank angle, and the piston stop position #1 of the intake stroke cylinder #1 is 90° after the exhaust top dead center in crank angle.

Moreover, in an example of an internal combustion engine having five or more cylinders, either or both of the number of intake stroke cylinders and the number of compression stroke cylinders may be two or more. In this example, the first start process may be performed for the plurality of compression stroke cylinders. Similarly, the second start process may be performed for the plurality of intake stroke cylinders. In an example of a single cylinder engine and an example of an inline two-cylinder engine with a phase difference of 360°, either the compression stroke cylinder or the intake stroke cylinder is obtained when the engine is stopped. Accordingly, the first or second start process may be performed in these examples.

Reference Example

Next, a technique (reference example) in which entry of oxygen into the catalyst immediately after engine start is reduced using neither the first start process nor the second start process will be described.

First, a powertrain system according to the reference example will be briefly described. This powertrain system includes an internal combustion engine, a first electric motor, a stop position sensor, and a control device as described below. The internal combustion engine includes at least one cylinder, a crankshaft, a fuel injection system, an ignition system, and an exhaust control catalyst. The fuel injection system includes a fuel injection valve that is disposed for each of the at least one cylinder and injects fuel into an intake port. The ignition system ignites an air-fuel mixture. The exhaust control catalyst is disposed in an exhaust passage. The first electric motor is configured to be able to crank the internal combustion engine. The stop position sensor detects a crank stop position of the crankshaft. The control device controls the internal combustion engine and the first electric motor and performs a stop position storage process, which is a process of storing the crank stop position detected by the stop position sensor. When the temperature of the exhaust control catalyst at the time engine start is requested is equal to or higher than a first threshold, the control device permits, based on the stored crank stop position, fuel injection to the at least one cylinder in synchronization with the start of cranking in response to the engine start request and causes ignition in the cylinder to which fuel has been injected. More specifically, when fuel injection is permitted as described above, fuel injection to the at least one cylinder is started using the intake asynchronous injection described above (a fuel injection method in which fuel injection is performed for each of the at least one cylinder during a crank angle period (e.g., the exhaust stroke) other than a period during which the intake valve is open).

An example of a specific configuration and control of the powertrain system according to the reference example specified as described above will be described with reference to FIGS. 13 to 16.

Figure 13:
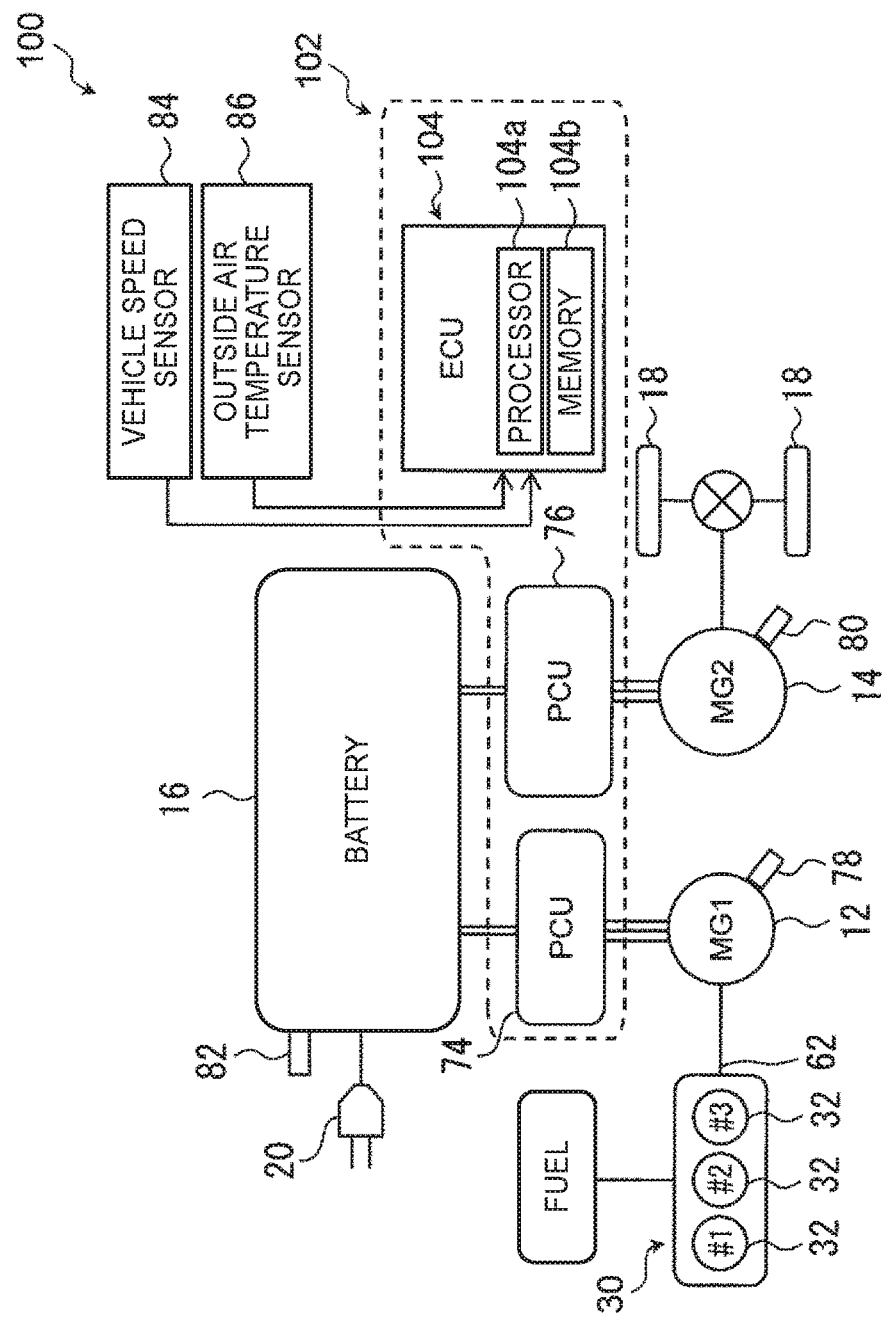
FIG. 13 schematically illustrates an example of a configuration of a powertrain system according to a reference example.

FIG. 13 schematically illustrates an example of the configuration of the powertrain system according to the reference example. A powertrain system 100 shown in FIG. 13 includes a control device 102 including an ECU 104. The ECU 104 includes a processor 104a and a memory 104b. The powertrain system 100 is different from the powertrain system 10 according to the first embodiment in the process that is performed by the control device 102 (more specifically, the ECU 104).

Like the powertrain system described above in "3. Other embodiments," the powertrain system according to the reference example may be configured not only for REEVs but also for any other type of hybrid vehicles or for the conventional vehicles including only an internal combustion engine as a driving source.

Figure 14:
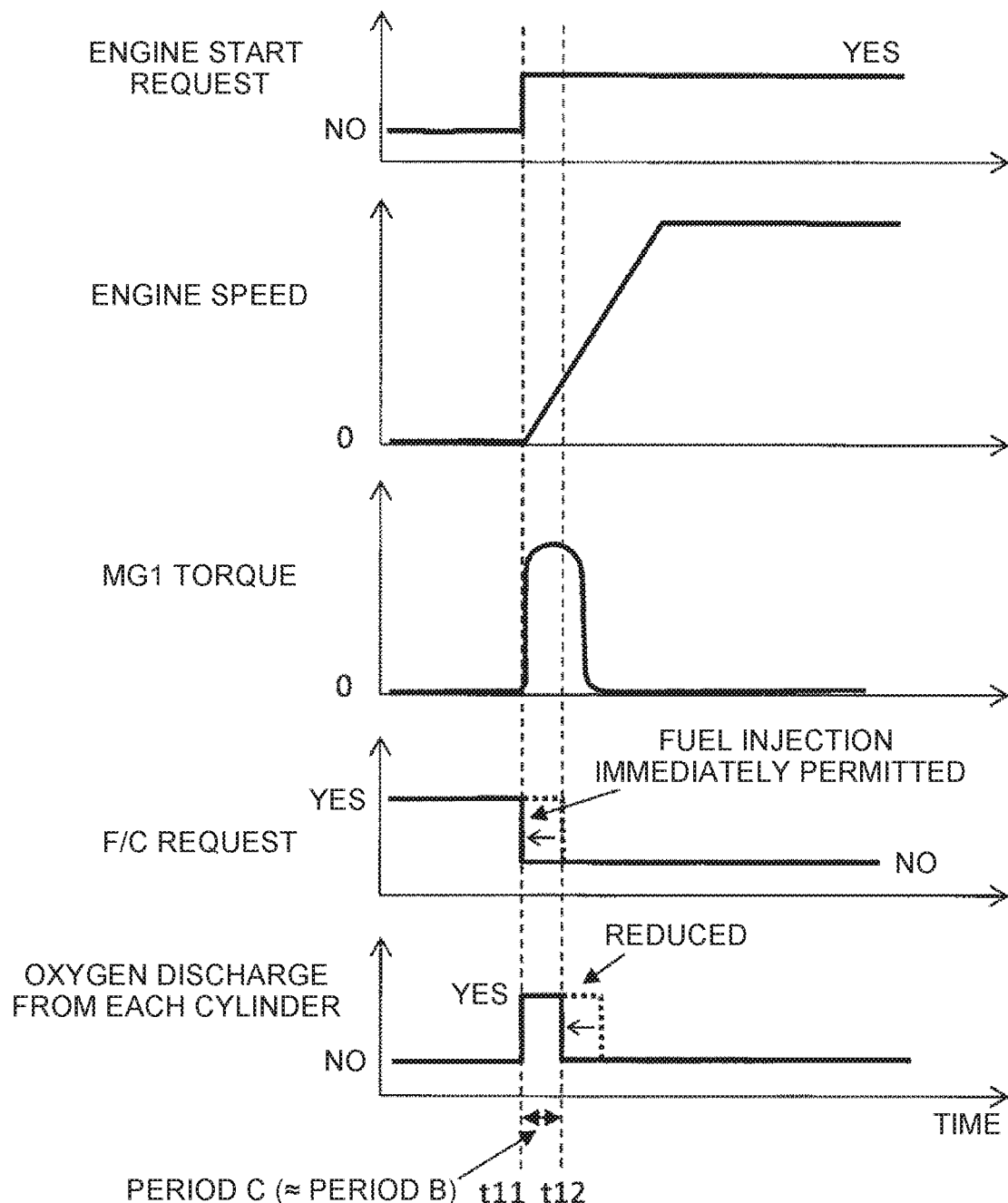
FIG. 14 is a timing chart of an operation that is performed upon intermittent engine start at a high catalyst temperature in the reference example.

Next, control for reducing entry of oxygen into catalyst 54 in the powertrain system 100 will be described. FIG. 14 is a timing chart of an operation that is performed upon intermittent engine start at a high catalyst temperature in the reference example. The differences of FIG. 14 from FIG. 7 will be described below. As in the first embodiment, in this reference example as well, the stop position storage process is executed when the engine is stopped, and the stop position of the crankshaft 62 is detected and stored.

As shown in FIG. 14, upon intermittent engine start, cranking is started using MG1 at time t11 when an engine start request is made. The cylinder identification process is not required because the stored value of the stop position of the crankshaft 62 is used. Accordingly, when the catalyst temperature T is equal to or higher than the threshold Tth, the F/C request is immediately canceled at time t11 (that is, fuel injection is immediately permitted). Fuel is thus sequentially injected to each cylinder 32 by the intake asynchronous injection using the stored value of the stop position.

Time t12 in FIG. 14 corresponds to the time when the crankshaft 62 has made two rotations since the start of cranking. A period C from time t11 to time t12 corresponds to the period B in FIG. 3. That is, in this reference example, even when the intake asynchronous injection for each cylinder 32 is started immediately after the start of cranking, oxygen is discharged from each cylinder 32 while the crankshaft 62 is making two rotations. However, as can be seen from comparison with the comparative example shown in FIG. 3, discharge of oxygen due to the presence of the period A required for the cylinder identification process is avoided.

As described above, according to the reference example as well, entry of oxygen into the catalyst 54 is reduced when the catalyst temperature T is equal to or higher than the threshold Tth. Catalyst deterioration is thus reduced.

Figure 15:
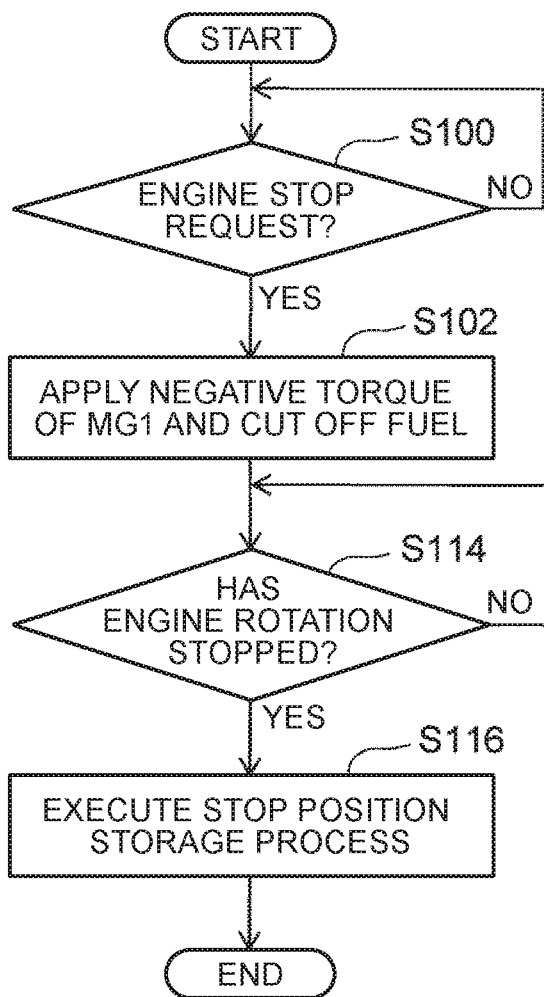
FIG. 15 is a flowchart of a process related to control that is performed when the engine is stopped according to the reference example.

FIG. 15 is a flowchart of a process related to control that is performed when the engine is stopped according to the reference example. Steps S100, S102, S114, and S116 in FIG. 15 are as described above in the first embodiment, and the procedure of the process will be described below. As shown in FIG. 14, when there is an engine stop request, application of the MG1 torque and fuel cutoff are sequentially performed in step S102. When the ECU 104 then determines in step S114 that engine rotation has stopped, it performs the stop position storage process to store the stop position of the crankshaft 62. The stop position storage process may be performed only when the catalyst temperature T is equal to or higher than the threshold Tth.

Figure 16:
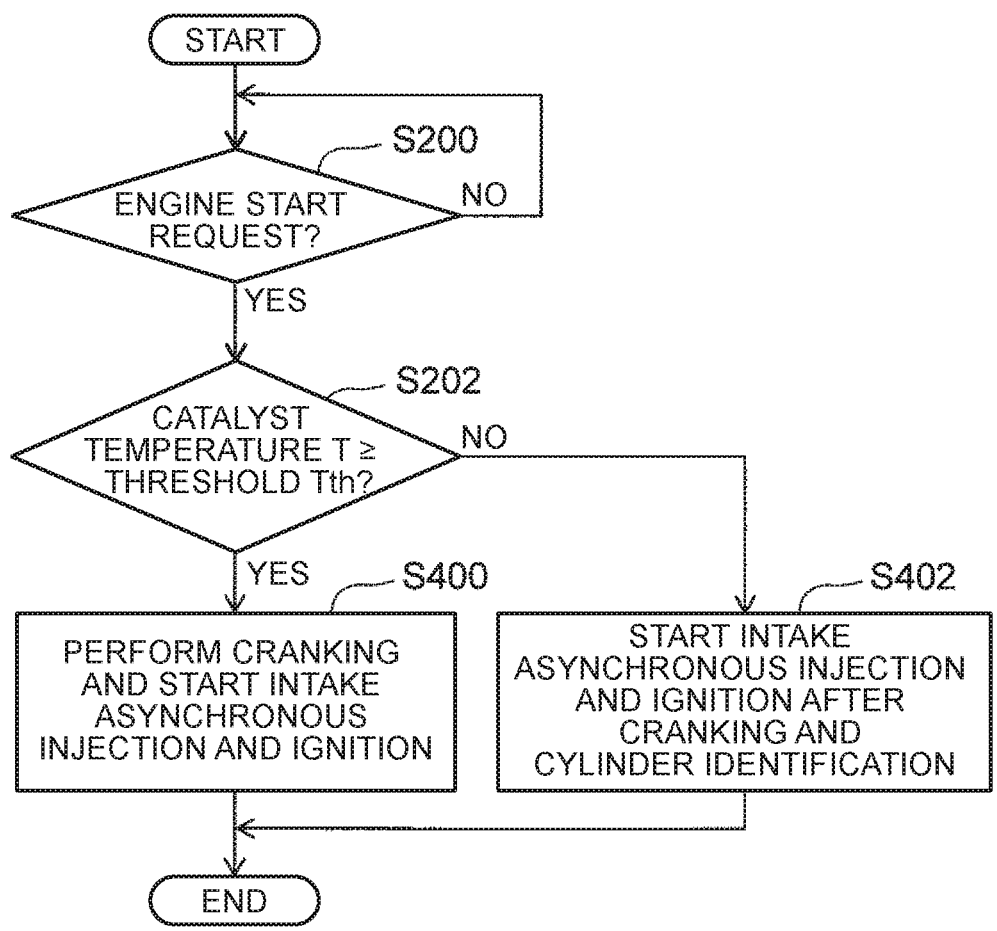
FIG. 16 is a flowchart of a process related to control that is performed upon intermittent engine start according to the reference example.

FIG. 16 is a flowchart of a process related to control that is performed upon intermittent engine start according to the reference example. Steps S200 and S202 in FIG. 16 are as described above in the first embodiment.

In the reference example, as shown in FIG. 16, when the determination result of step S202 is Yes (catalyst temperature T threshold Tth), the routine proceeds to step S400. In step S400, the ECU 104 starts cranking using MG1. The ECU 104 also starts the intake asynchronous injection and the ignition of each cylinder 32 in synchronization with the start of the cranking, based on the information on the stop position of the crankshaft 62 stored when the engine was stopped.

When the determination result of step S202 is No (catalyst temperature T<threshold Tth), the routine proceeds to step S402. In step S402, the ECU 104 starts cranking using MG1 and performs the cylinder identification process. The ECU 104 starts the intake asynchronous injection and the ignition of each cylinder 32 after completion of the cylinder identification process.

The examples described in each embodiment, the modifications, and the reference example may be combined as appropriate in addition to the illustrated combinations. Various modifications may be made without departing from the spirit and scope of the disclosure.

What is claimed is:

1. A powertrain system, comprising:
    an internal combustion engine that is an inline three-cylinder engine and includes
      three cylinders,
      a crankshaft,
      a fuel injection system including a fuel injection valve for each of the three cylinders, the fuel injection valve being configured to inject fuel into an intake port,
      an ignition system that ignites an air-fuel mixture, and
      an exhaust control catalyst disposed in an exhaust passage;
    a first electric motor that is able to crank the internal combustion engine;
    a stop position sensor that detects a crank stop position of the crankshaft;
    a rotating electrical machine coupled to the crankshaft; and
    a control device configured to
      control the internal combustion engine and the first electric motor,
      perform a stop position storage process of storing the crank stop position detected by the stop position sensor,
      execute an early start mode when a temperature of the exhaust control catalyst at a time an engine start request is made is equal to or higher than a first threshold, the early start mode being a mode in which the internal combustion engine is started by at least one of a first start process and a second start process,
      execute a normal start mode when the temperature of the exhaust control catalyst at the time the engine start request is made is lower than the first threshold, the normal start mode being a mode in which the internal combustion engine is started by neither the first start process nor the second start process, and
      perform stop position control, the stop position control being control in which the rotating electrical machine is controlled such that the crank stop position is located within a predetermined range that is required to perform at least one of the first start process and the second start process, wherein
    the first start process is a process that is performed for a compression stroke cylinder that is in a compression stroke while the engine is stopped, and is a process in which fuel injection is performed such that fuel is introduced into the compression stroke cylinder during a last intake stroke that is performed in a course of stopping the engine, and based on the stored crank stop position, ignition is performed in a first cycle of the compression stroke cylinder after start of cranking in response to the engine start request,
    the second start process is a process that is performed for an intake stroke cylinder that is in an intake stroke while the engine is stopped, and is a process in which, based on the stored crank stop position, fuel injection is performed during a period from a time when the engine start request is made to a first timing at which an intake valve is closed after the start of the cranking, and based on the stored crank stop position, ignition is performed in a first cycle of the intake stroke cylinder after the start of the cranking,
    the compression stroke and the intake stroke are strokes of a piston inside each of the three cylinders once movement of the internal combustion engine starts, and
    a reference position of the predetermined range of the crank stop position is such a position that a piston stop position of the compression stroke cylinder is 60° before a compression top dead center in crank angle and a piston stop position of the intake stroke cylinder is 60° after an exhaust top dead center in the crank angle.

2. The powertrain system according to claim 1, wherein the first electric motor is a motor generator that is able to crank the internal combustion engine and that also generates electric power using power of the internal combustion engine, the powertrain system further comprising:
    a second electric motor that drives a vehicle equipped with the powertrain system; and
    a battery that stores the electric power generated by the motor generator, wherein
    the control device controls the second electric motor and the motor generator.

3. The powertrain system according to claim 2, wherein the internal combustion engine is exclusively for power generation.

4. The powertrain system according to claim 2, wherein the control device starts the fuel injection by the second start process before the start of the cranking.

5. The powertrain system according to claim 1, wherein the control device starts the fuel injection by the second start process in synchronization with the start of the cranking.

6. A powertrain system, comprising:
    an internal combustion engine including
      at least one cylinder,
      a crankshaft,
      a fuel injection system including a fuel injection valve for each of the at least one cylinder, the fuel injection valve being configured to inject fuel into an intake port,
      an ignition system that ignites an air-fuel mixture, and
      an exhaust control catalyst disposed in an exhaust passage;
    a first electric motor that is able to crank the internal combustion engine;
    a stop position sensor that detects a crank stop position of the crankshaft; and
    a control device configured to
      control the internal combustion engine and the first electric motor,
      perform a stop position storage process of storing the crank stop position detected by the stop position sensor,
      execute an early start mode when a temperature of the exhaust control catalyst at a time an engine start request is made is equal to or higher than a first threshold, the early start mode being a mode in which the internal combustion engine is started by at least one of a first start process and a second start process,
      execute a normal start mode when the temperature of the exhaust control catalyst at the time the engine start request is made is lower than the first threshold, the normal start mode being a mode in which the internal combustion engine is started by neither the first start process nor the second start process, and in the early start mode, the control device performs both the first start process and the second start process when a vehicle speed of a vehicle equipped with the powertrain system is equal to or higher than a second threshold, and performs only one of the first start process and the second start process when the vehicle speed is lower than the second threshold, wherein the first start process is a process that is performed for a compression stroke cylinder that is in a compression stroke while the engine is stopped, and is a process in which fuel injection is performed such that fuel is introduced into the compression stroke cylinder during a last intake stroke that is performed in a course of stopping the engine, and based on the stored crank stop position, ignition is performed in a first cycle of the compression stroke cylinder after start of cranking in response to the engine start request, the second start process is a process that is performed for an intake stroke cylinder that is in an intake stroke while the engine is stopped, and is a process in which, based on the stored crank stop position, fuel injection is performed during a period from a time when the engine start request is made to a first timing at which an intake valve is closed after the start of the cranking, and based on the stored crank stop position, ignition is performed in a first cycle of the intake stroke cylinder after the start of the cranking, and the compression stroke and the intake stroke are strokes of a piston inside the at least one cylinder once movement of the internal combustion engine starts.

7. The powertrain system according to claim 6, wherein
the first electric motor is a motor generator that is able to crank the internal combustion engine and that generates electric power using power of the internal combustion engine, the powertrain system further comprising:
a second electric motor that drives the vehicle; and
a battery that stores the electric power generated by the motor generator, wherein
in the early start mode, the control device performs only one of the first start process and the second start process when the vehicle speed is lower than the second threshold and a remaining charge level of the battery is higher than a third threshold, and performs both the first start process and the second start process when the vehicle speed is lower than the second threshold but the remaining charge level of the battery is equal to or lower than the third threshold.

8. The powertrain system according to claim 6, wherein
the first electric motor is a motor generator that is able to crank the internal combustion engine and that also generates electric power using power of the internal combustion engine, the powertrain system further comprising:
a second electric motor that drives the vehicle equipped with the powertrain system; and
a battery that stores the electric power generated by the motor generator, wherein
the control device controls the second electric motor and the motor generator.

9. The powertrain system according to claim 8, wherein
the internal combustion engine is exclusively for power generation.

10. The powertrain system according to claim 8, wherein
the control device starts the fuel injection by the second start process before the start of the cranking.

11. The powertrain system according to claim 6, wherein
the control device starts the fuel injection by the second start process in synchronization with the start of the cranking.

12. A powertrain system, comprising:
an internal combustion engine including
  at least one cylinder,
  a crankshaft,
  a fuel injection system including a fuel injection valve for each of the at least one cylinder, the fuel injection valve being configured to inject fuel into an intake port,
  an ignition system that ignites an air-fuel mixture, and
  an exhaust control catalyst disposed in an exhaust passage;
a first electric motor, the first electric motor being a motor generator that is able to crank the internal combustion engine and that also generates electric power using power of the internal combustion engine;
a stop position sensor that detects a crank stop position of the crankshaft;
a second electric motor that drives a vehicle equipped with the powertrain system;
a battery that stores the electric power generated by the motor generator; and
a control device configured to
  control the internal combustion engine, the first electric motor, and the second electric motor,
  perform a stop position storage process of storing the crank stop position detected by the stop position sensor,
  execute an early start mode when a temperature of the exhaust control catalyst at a time an engine start request is made is equal to or higher than a first threshold, the early start mode being a mode in which the internal combustion engine is started by at least one of a first start process and a second start process,
  execute a normal start mode when the temperature of the exhaust control catalyst at the time the engine start request is made is lower than the first threshold, the normal start mode being a mode in which the internal combustion engine is started by neither the first start process nor the second start process, and
  advance a timing at which fuel injection by the second start process is started when an outside air temperature is low as compared to when the outside air temperature is high, wherein the first start process is a process that is performed for a compression stroke cylinder that is in a compression stroke while the engine is stopped, and is a process in which fuel injection is performed such that fuel is introduced into the compression stroke cylinder during a last intake stroke that is performed in a course of stopping the engine, and based on the stored crank stop position, ignition is performed in a first cycle of the compression stroke cylinder after start of cranking in response to the engine start request, the second start process is a process that is performed for an intake stroke cylinder that is in an intake stroke while the engine is stopped, and is a process in which, based on the stored crank stop position, the fuel injection is performed during a period from a time when the engine start request is made to a first timing at which an intake valve is closed after the start of the cranking, and based on the stored crank stop position, ignition is performed in a first cycle of the intake stroke cylinder after the start of the cranking, and the compression stroke and the intake stroke are strokes of a piston inside the at least one cylinder once movement of the internal combustion engine starts.

13. The powertrain system according to claim 12, wherein the control device starts the fuel injection by the second start process in synchronization with the start of the cranking.

14. A powertrain system, comprising:
an internal combustion engine including
   at least one cylinder,
   a crankshaft,
   a fuel injection system including a fuel injection valve for each of the at least one cylinder, the fuel injection valve being configured to inject fuel into an intake port,
   an ignition system that ignites an air-fuel mixture, and
   an exhaust control catalyst disposed in an exhaust passage;
a first electric motor that is able to crank the internal combustion engine;
a stop position sensor that detects a crank stop position of the crankshaft; and
a control device configured to
   control the internal combustion engine and the first electric motor,
   perform a stop position storage process of storing the crank stop position detected by the stop position sensor,
   execute an early start mode when a temperature of the exhaust control catalyst at a time an engine start request is made is equal to or higher than a first threshold, the early start mode being a mode in which the internal combustion engine is started by at least one of a first start process and a second start process, and
   execute a normal start mode when the temperature of the exhaust control catalyst at the time the engine start request is made is lower than the first threshold, the normal start mode being a mode in which the internal combustion engine is started by neither the first start process nor the second start process, wherein the first start process is a process that is performed for a compression stroke cylinder that is in a compression stroke while the engine is stopped, and is a process in which fuel injection is performed such that fuel is introduced into the compression stroke cylinder during a last intake stroke that is performed in a course of stopping the engine, and based on the stored crank stop position, ignition is performed in a first cycle of the compression stroke cylinder after start of cranking in response to the engine start request, the second start process is a process that is performed for an intake stroke cylinder that is in an intake stroke while the engine is stopped, and is a process in which, based on the stored crank stop position, fuel injection is performed during a period from a time when the engine start request is made to a first timing at which an intake valve is closed after the start of the cranking, and based on the stored crank stop position, ignition is performed in a first cycle of the intake stroke cylinder after the start of the cranking, the compression stroke and the intake stroke are strokes of a piston inside the at least one cylinder once movement of the internal combustion engine starts, and the first threshold is equal to or higher than 700° C.

15. The powertrain system according to claim 14, wherein
the first electric motor is a motor generator that is able to crank the internal combustion engine and that also generates electric power using power of the internal combustion engine, the powertrain system further comprising:
a second electric motor that drives a vehicle equipped with the powertrain system; and
a battery that stores the electric power generated by the motor generator, wherein
the control device controls the second electric motor and the motor generator.

16. The powertrain system according to claim 15, wherein the internal combustion engine is exclusively for power generation.

17. The powertrain system according to claim 15, wherein the control device starts the fuel injection by the second start process before the start of the cranking.

* * * * *